United States Patent
Takao

(10) Patent No.: US 9,203,890 B2
(45) Date of Patent: Dec. 1, 2015

(54) RELAY DEVICE, RELAY SYSTEM, AND RELAY METHOD

(71) Applicant: FUJITSU LIMITED, Kawasaki-shi, Kanagawa (JP)

(72) Inventor: Sachio Takao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 239 days.

(21) Appl. No.: 13/686,789

(22) Filed: Nov. 27, 2012

(65) Prior Publication Data

US 2013/0086227 A1    Apr. 4, 2013

Related U.S. Application Data

(63) Continuation of application No. PCT/JP2010/058967, filed on May 27, 2010.

(51) Int. Cl.
*H04L 29/08* (2006.01)

(52) U.S. Cl.
CPC .......... *H04L 67/00* (2013.01); *H04L 29/08117* (2013.01); *H04L 67/06* (2013.01)

(58) Field of Classification Search
CPC .............................. H04L 67/00; G04L 67/00
USPC .......................................................... 709/219
See application file for complete search history.

(56) References Cited

U.S. PATENT DOCUMENTS

| | | | | |
|---|---|---|---|---|
| 6,144,992 A | * | 11/2000 | Turpin et al. | 709/208 |
| 7,162,538 B1 | * | 1/2007 | Cordova | 709/238 |
| 2003/0135553 A1 | | 7/2003 | Pendakur | |
| 2010/0195500 A1 | | 8/2010 | Sejimo | |

FOREIGN PATENT DOCUMENTS

| | | | | |
|---|---|---|---|---|
| CN | 1697418 | | 11/2005 | |
| JP | 2001-325207 A | | 11/2001 | |
| JP | 2003-196191 A | | 7/2003 | |
| JP | 2003196191 A | * | 7/2003 | .............. G06F 13/00 |
| JP | 2005-267547 A | | 9/2005 | |
| JP | 2005-303772 A | | 10/2005 | |
| JP | 2005303772 A | * | 10/2005 | .............. H04L 12/56 |

(Continued)

OTHER PUBLICATIONS

Notice of Reason for Rejection dated Mar. 25, 2014 with its English translation issued in the corresponding Japanese application No. 2012-517049. (English translation).

(Continued)

*Primary Examiner* — David Lazaro
*Assistant Examiner* — Zia Khurshid
(74) *Attorney, Agent, or Firm* — Maschoff Brennan

(57) ABSTRACT

A relay system for distributing load on a data sending device in data communications among a plurality of devices includes a plurality of devices and a relay device to relay data communications among the devices. The devices each include a transmission unit that sends data, and a reception unit that receives data. The relay device includes a storage unit that stores information identifying relayed data with information identifying the recipient of the data, and a determination unit that, in response to a data acquisition request for predetermined data issued by a predetermined device, determines a device to send the determined data based on information in the storage unit.

5 Claims, 16 Drawing Sheets

(56) References Cited

FOREIGN PATENT DOCUMENTS

| | | |
|---|---|---|
| JP | 2008-005512 A | 1/2008 |
| JP | 2009-225210 A | 10/2009 |

OTHER PUBLICATIONS

International Search Report mailed on Aug. 17, 2010 in related application No. PCT/JP2010/058967.

International Preliminary Report on Patentability mailed on Dec. 13, 2012 in application No. PCT/JP2010/058967.

First Office Action dated Sep. 2, 2014 and Search Report attached thereto with English translations issued in the corresponding Chinese application No. 201080067065.8.

The second Office Action dated Apr. 22, 2015 and the Search Report attached thereto with English translations issued in the corresponding Chinese application No. 201080067065.8 Full translation.

* cited by examiner

FIG. 5

DEVICE INFORMATION TABLE

| | MAC ADDRESS | SUBSTITUTION REQUEST FLAG |
|---|---|---|
| FILE SERVER 2 | xx-xx-xx-xx-xx-S2 | 1 |
| CLIENT 10 | xx-xx-xx-xx-xx-C1 | 0 |
| CLIENT 20 | xx-xx-xx-xx-xx-C2 | 1 |
| CLIENT 30 | xx-xx-xx-xx-xx-C3 | 0 |

FIG. 7

COMMUNICATION INFORMATION RECORDING TABLE

| CLIENT MAC ADDRESS | SERVER MAC ADDRESS | CLIENT IP ADDRESS | SERVER IP ADDRESS | CLIENT FILE PATH | SERVER FILE PATH | COMMUNICATION COMPLETION FLAG |
|---|---|---|---|---|---|---|
| xx-xx-xx-xx-xx-C1 | xx-xx-xx-xx-xx-S2 | 192.168.0.11 | 192.168.0.1 | ¥W¥a.txt | ¥Master¥a.txt | 1 |
| xx-xx-xx-xx-xx-C2 | xx-xx-xx-xx-xx-S2 | 192.168.0.12 | 192.168.0.1 | ¥W¥a.txt | ¥Master¥a.txt | 1 |
| xx-xx-xx-xx-xx-C1 | xx-xx-xx-xx-xx-S2 | 192.168.0.11 | 192.168.0.1 | ¥W¥b.txt | ¥Master¥b.txt | 1 |

FIG. 8

CONVERSION INFORMATION TABLE

| MAC ADDRESS | | | IP ADDRESS | | |
|---|---|---|---|---|---|
| CLIENT | SERVER | SUBSTITUTE SERVER | CLIENT | SERVER | SUBSTITUTE SERVER |
| XX-XX-XX-XX-XX-C3 | XX-XX-XX-XX-XX-S2 | XX-XX-XX-XX-XX-C1 | 192.168.0.13 | 192.168.0.1 | 192.168.0.11 |
| | | | | | |
| | | | | | |
| | | | | | |

| FILE PATH | | | PORT NUMBER | | | FILE ID | | CONTROL FLAG |
|---|---|---|---|---|---|---|---|---|
| CLIENT | SERVER | SUBSTITUTE SERVER | CLIENT | SERVER | SUBSTITUTE SERVER | SERVER | SUBSTITUTE SERVER | UPDATE FLAG |
| ¥¥a.txt | ¥Master¥a.txt | ¥¥a.txt | 1071 | 445 | 445 | 0xc00f | 0xc00f | 0 |
| | | | | | | | | |
| | | | | | | | | |
| | | | | | | | | |

RELAY DEVICE, RELAY SYSTEM, AND RELAY METHOD

CROSS-REFERENCE TO RELATED APPLICATION

This application is a continuation application of International Application PCT/JP2010/058967, filed on May 27, 2010, and designated the U.S., the entire contents of which are incorporated herein by reference.

FIELD

The present invention relates to a relay device to relay communications among a plurality of devices.

BACKGROUND

On a manufacturing line of personal computers (hereinafter "PCs"), for example, file servers and PCs are connected with a switch so that data needed for individual PCs, such as an operating system (OS), is downloaded to the PCs from a file server at a time.

When requests for file downloading to multiple clients are concentrated on a particular file server, the performance of the file server or that of a network, such as Ethernet (registered trademark), can cause a bottleneck. The bottleneck lowers data transfer efficiency, leading to less efficient performance of the entire network. File server performance depends on specifications of hardware, such as a CPU (Central Processing Unit), a memory, and an HDD (Hard Disc Drive), for example.

Patent Document

[Patent document 1] Japanese Patent Publication No. 2001-325207
[Patent document 2] Japanese Patent Publication No. 2008-005512

When a certain file server can have increased load due to concentration of requests for downloading to multiple clients, the performance efficiency of the entire network can be improved by providing file servers and/or the network in a dual-redundant configuration. However, dual-redundant configuration of file servers and a network can cost enormous capital investment. If load on file servers could be reduced, the performance efficiency of the entire network could be improved without such investment.

SUMMARY

According to an aspect of the embodiment is a relay device. The relay device is for relaying data communications among a plurality of devices, the relay device including:
a storage unit that stores information identifying relayed data with information identifying a recipient of the data; and
a determination unit that, in response to a data acquisition request for predetermined data issued by a predetermined device among the plurality of devices, determines a data sending device of the predetermined data based on information in the storage unit.

Another aspect of the invention is a relay system including the relay device, a relay method, program, and computer-readable recording medium having stored therein the program.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a device information table;
FIG. 7 is a diagram illustrating an example of a communication information recording table;
FIG. 8 is a diagram illustrating an example of a conversion information table.

DESCRIPTION OF EMBODIMENTS

Hereinafter, a mode for practicing the invention (hereinafter referred to as an embodiment) will be described with reference to drawings. The configuration of the embodiments is illustrative and the invention is not limited to the configuration of the embodiments.

First Embodiment

Figure 1:
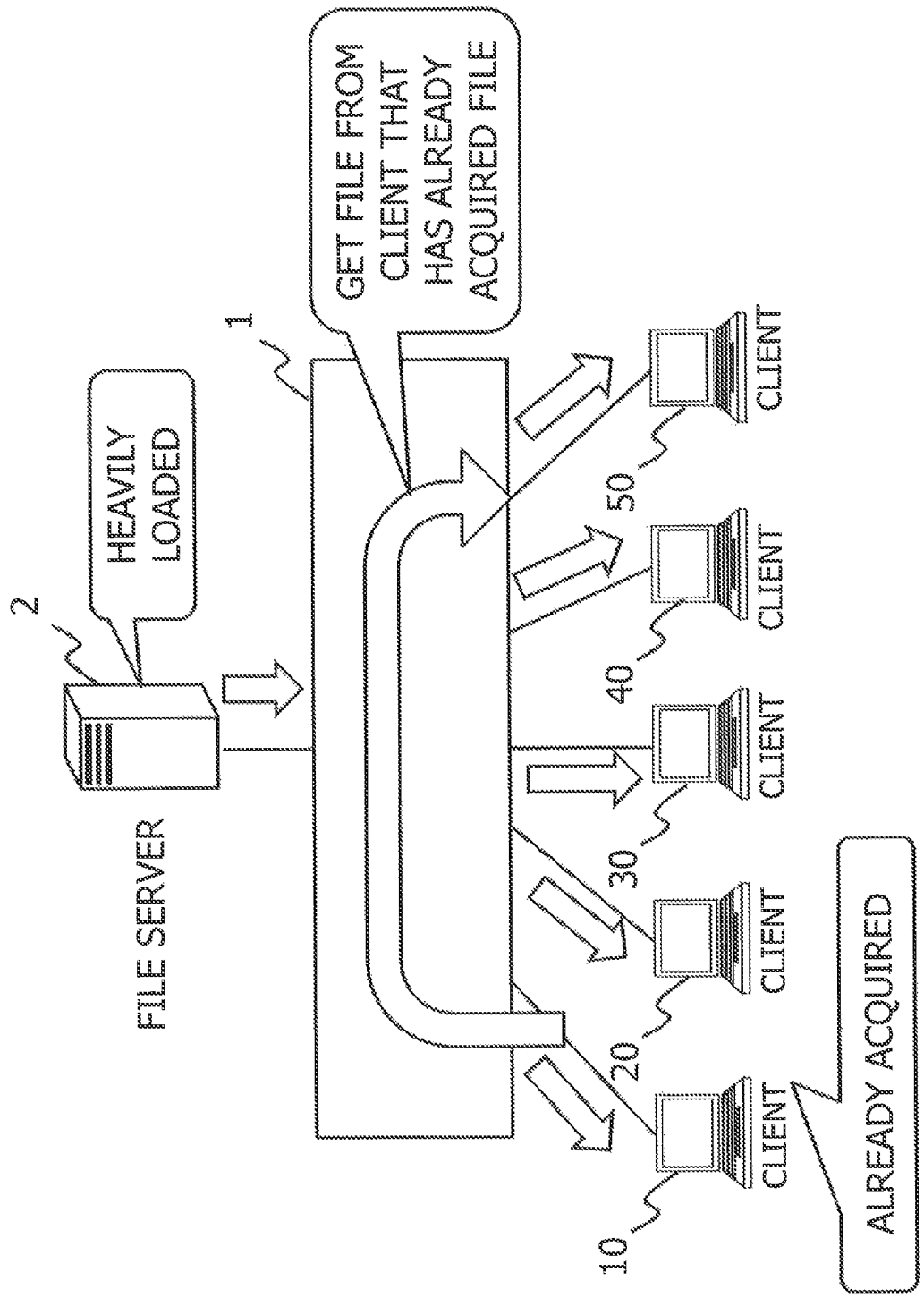
FIG. 1 is a diagram illustrating an example of a data distribution network system.

FIG. 1 is a diagram illustrating an example of a data distribution network system. For example, the data distribution network system includes a file server 2, a switch 1 connected with the file server 2, and client terminals 10, 20, 30, 40, and 50 each connected with the switch 1. Consider a case where the client terminals download the same file from the file server 2 via the switch 1. Hereinafter, the client terminals will be denoted just as "clients" in the figures.

The data distribution network is a network set up for downloading and installation of software to a plurality of PCs on a manufacturing line of PCs, for example. In this case, the client terminals 10, 20, 30, 40, 50 are PCs being manufactured and the file server 2 is a PC that keeps data files of software to be set up in the client terminals. The file server 2 and client terminals exchange files using the same file sharing protocol. The file sharing protocol may be an SMB (Server Message Block) or a CIFS (Common Internet File System) used in Windows (registered trademark) OSs, for example.

Figure 2:
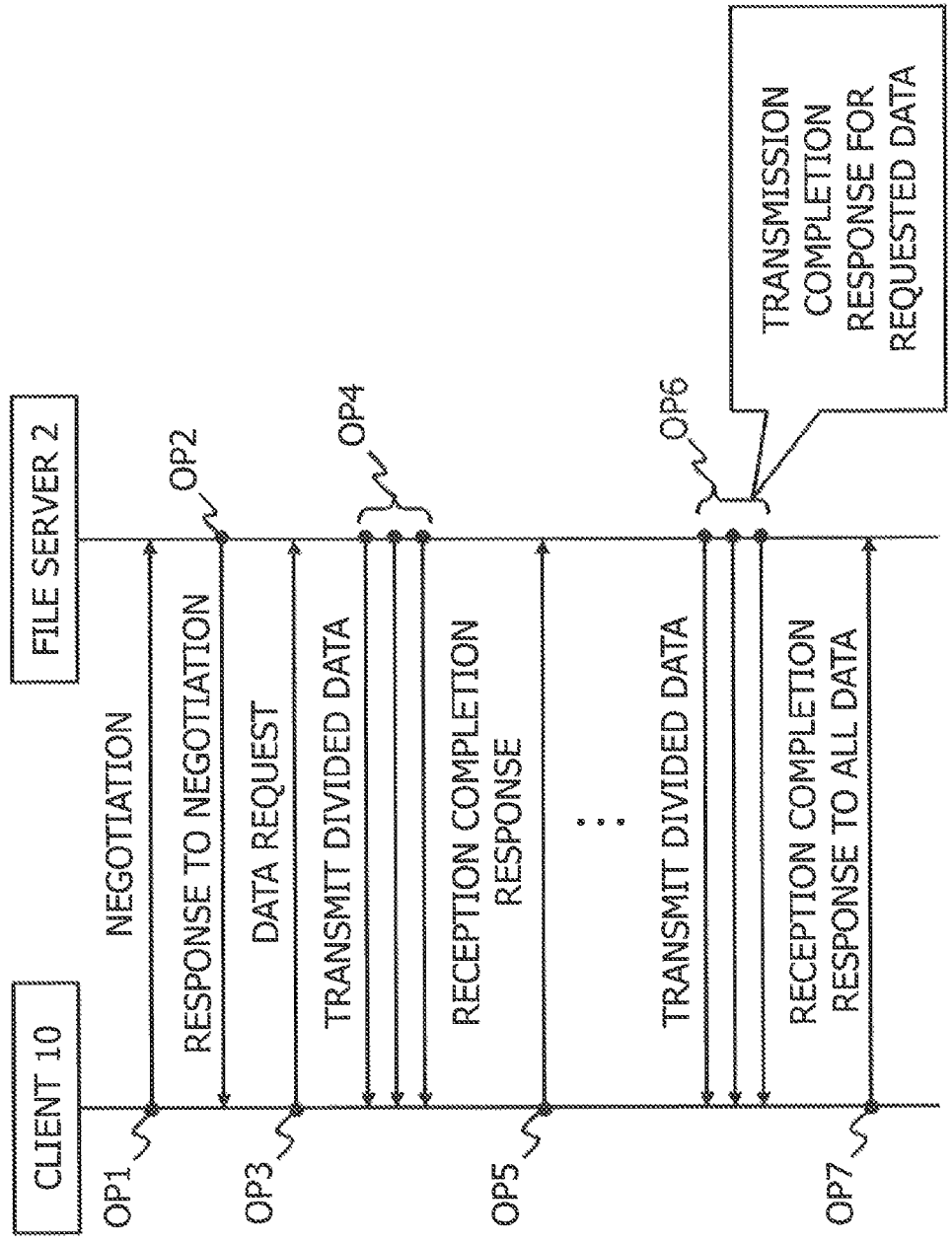
FIG. 2 is a diagram illustrating of an example of a schematically operation for a client terminal to read file data from a file server.

FIG. 2 is a diagram illustrating an example of a schematically operations that are performed when the client terminal 10 reads file data from the file server 2 in the data distribution network system of FIG. 1. The example of FIG. 2 illustrates a case where an SMB is used as the file sharing protocol. Although FIG. 2 illustrates the client terminal 10 and the file server 2, the switch 1 intervenes between the client terminal 10 and the file server 2, relaying communications between the client terminal 10 and the file server 2.

First, the client terminal 10 initiates negotiation with the file server 2 (OP 1). The file server 2 sends a response to the client terminal 10 (OP 2). Through the negotiation, a preliminary process needed for data reading is performed, including session establishment, coordination of protocol levels supported, acquisition of information relating to a target file, and file ID assignment.

When the preliminary process between the client terminal 10 and the file server 2 ends, the client terminal 10 sends a data request for the target file to the file server 2 (OP 3). The data request includes the file ID of the target file, an offset address indicating the location in the target file at which to start data transmission, a sequence number and the like.

Upon receiving the data request from the client terminal 10, the file server 2 divides the target file and sends data to the client terminal 10 (OP 4). The file server 2 may send data of a predetermined data size without waiting for a reception completion response from the client terminal 10.

Upon receiving the data of the predetermined data size from the file server 2, the client terminal 10 sends a reception completion response to the file server 2 (OP 5). Transmission of divided data and a reception completion response to it as in OP 4 and OP 5 are repeated between the client terminal 10 and the file server 2.

After sending the last data for the target file, the file server 2 sends a transmission completion response for the requested file data to the client terminal 10 (OP 6).

Upon receiving the transmission completion response from the file server 2, the client terminal 10 sends a reception completion response to all of the requested data to the file server 2, and then reading of the target file ends (OP 7).

If the client terminal 10 then proceeds to read another file from the file server 2, the process starts from OP 3, where a data request is sent, since a session is already established between the client terminal 10 and the file server 2.

When many communications for data reading as illustrated in FIG. 2 are concentrated on a file server, the data transfer efficiency of the file server will lower due to a bottleneck, resulting in a reduced performance of the entire network.

In a first embodiment, a switch connecting between a client terminal and a file server stores information identifying relayed data and information identifying its recipient in a storage unit such that the pieces of information are associated with one another, in data reading communication from the client terminal to the file server. For a request to acquire specific data sent from a specific client terminal, the switch determines a device which will send the specific data based on information stored in the storage unit. When accesses concentrate on the file server, for example, the switch selects a client terminal that has already read the data as the sender of data in response to a data acquisition request to the file server based on the information stored in the storage unit. This can distribute load on the file server and improve the performance efficiency of the entire network.

Device Configuration

Switch

Hardware Configuration

Figure 3:
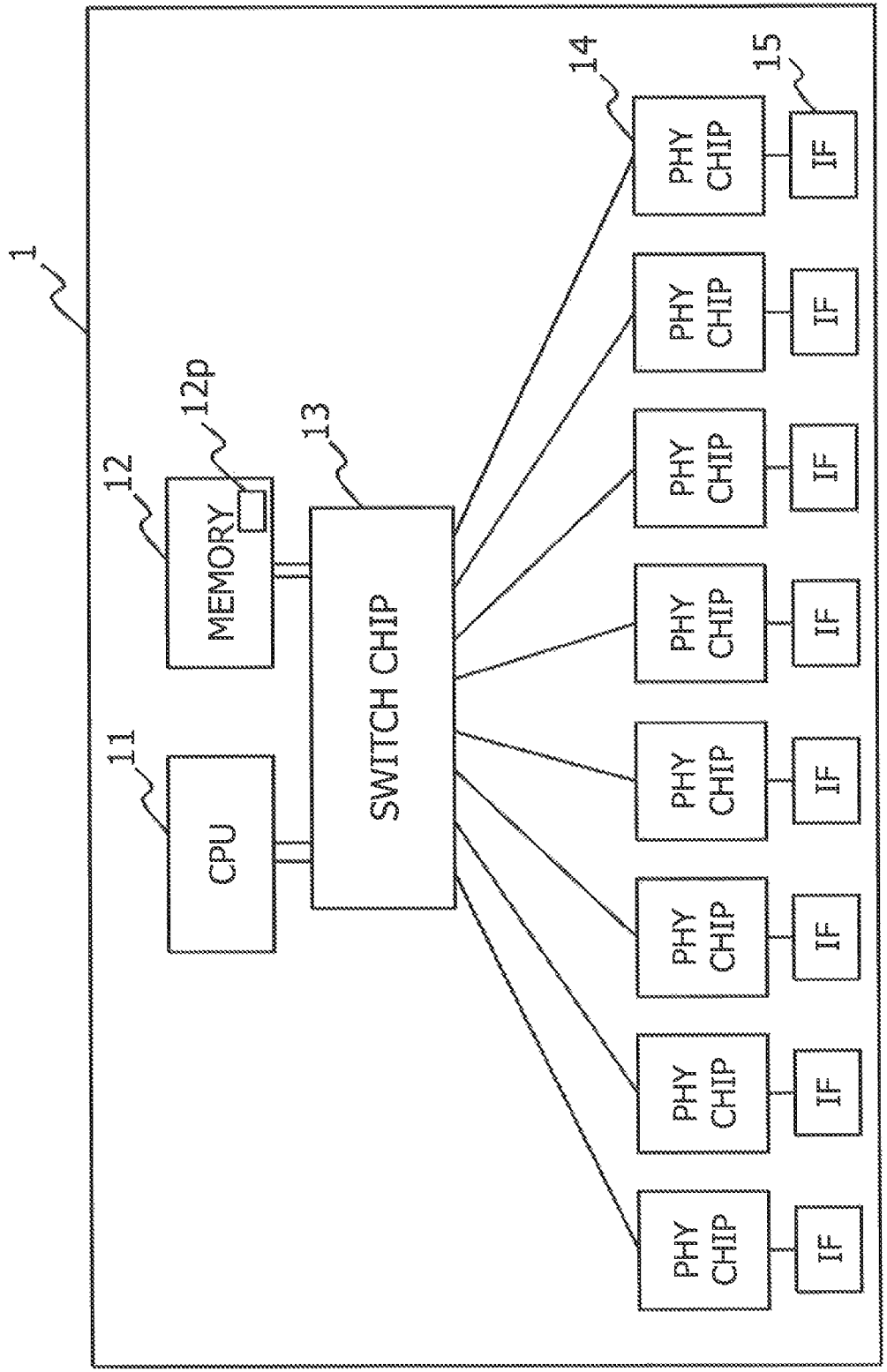
FIG. 3 is a diagram illustrating an example of a hardware configuration of a switch.

FIG. 3 is a diagram illustrating an example of a hardware configuration of the switch. A switch 1 includes a CPU 11, a memory 12, a switch chip 13, multiple PHY (PHYsical) chips 14, and multiple interfaces (IF) 15 provided for the respective PHY chips.

The interfaces 15 may be RJ45, an interface standard for connecting Ethernet (registered trademark) cables, for example. The interfaces 15 may also be optical modules for connecting optical cables and converting optical signals into electric signals.

The PHY chip 14 performs a process for Layer 1 of the OSI (Open Systems Interconnection) reference model on a transmission signal input from the interface 15 and generates frames. The generated frames are output to the switch chip 13. When the frames are input from the switch chip 13, the PHY chip 14 converts the frames into transmission signals and outputs them to the interface 15.

The switch chip 13 receives frames from the PHY chip 14. The switch chip 13 outputs the frames to an appropriate interface 15 via the PHY chip 14 in accordance with the destination MAC address of the input frames.

The memory 12 is implemented by a DRAM (Dynamic Access Memory) or a flash memory, for example. The memory 12 may be a combination of DRAM and flash memory, for example. The memory 12 provides work and/or storage areas for the CPU 11. The memory 12 maintains a relay program 12p in a non-volatile area.

The CPU 11 manages the entire switch 1 and executes the relay program 12p stored in the memory 12. Execution of the relay program 12p by the CPU 11 causes the switch 1 to store information identifying data relayed in data reading communication from a client terminal to the file server and information identifying the recipient of the data, in the storage unit. Execution of the relay program 12p by the CPU 11 also causes the switch 1 to determine the sender of data for a data acquisition request issued by the client terminal based on information stored in the storage unit. For example, execution of the relay program 12p causes the switch 1 to convert data reading communication from the client terminal to the file server into data reading communication with the client terminal that has already read the target file. Hereinafter, a process for converting data reading communication from the client terminal to the file server into data reading communication with the client terminal that has already read the target file will be referred to as a communication conversion process.

Functional Blocks

Figure 4:
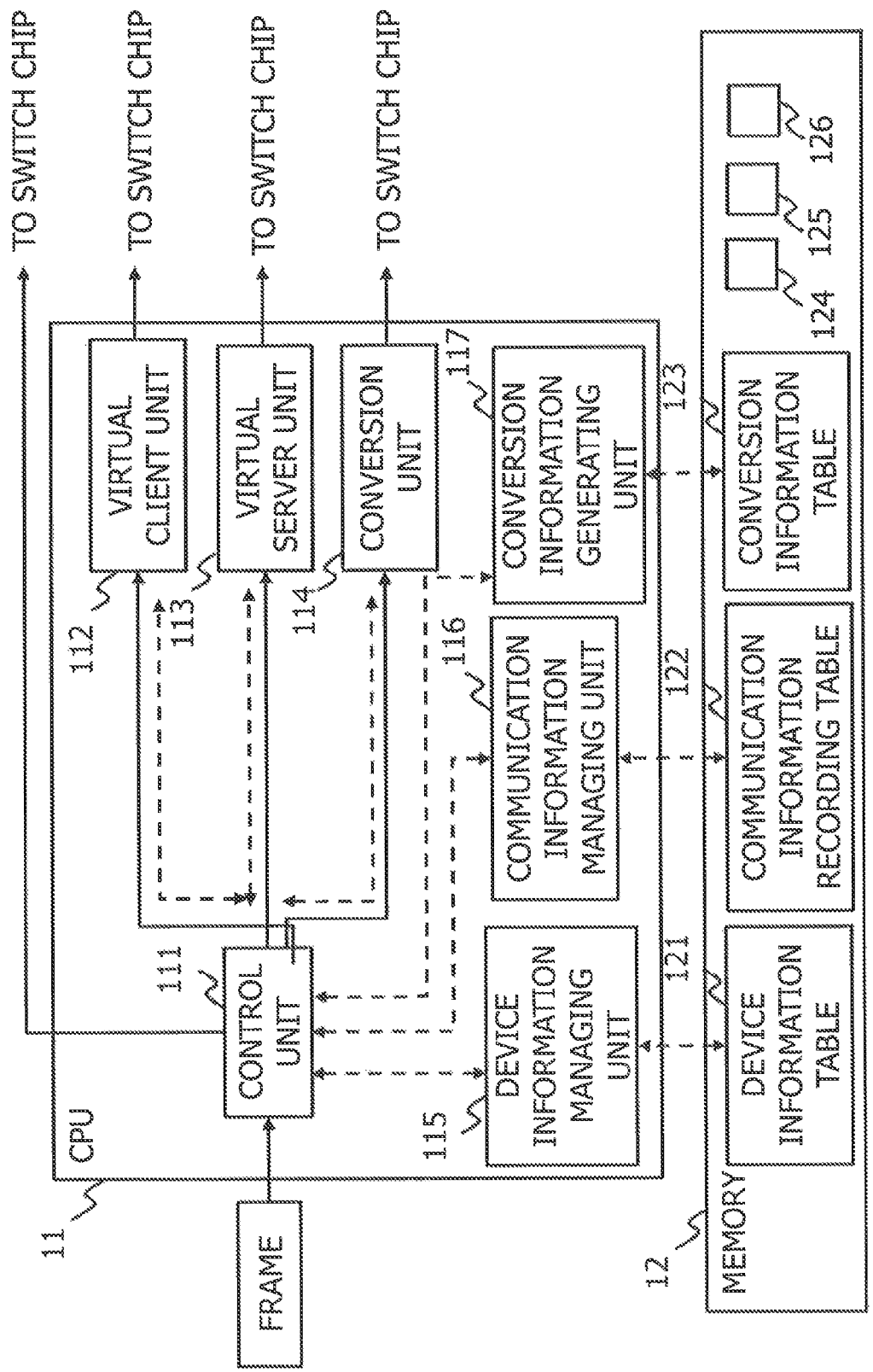
FIG. 4 is a diagram illustrating an example of functional blocks of the switch for a case where the relay program is executed.

FIG. 4 is a diagram illustrating an example of functional blocks of the switch 1 for a case where the relay program 12p is executed.

In response to execution of the relay program 12p, the CPU 11 functions as a control unit 111, a virtual client unit 112, a virtual server unit 113, a conversion unit 114, a device information managing unit 115, a communication information managing unit 116, and a conversion information generating unit 117, and carries out a communication conversion process. The memory 12 maintains a device information table 121, a communication information recording table 122, a conversion information table 123, a MAC (Media Access Control) table 124, a virtual client communication table 125, and a virtual server communication table 126.

Control Unit

The control unit 111 accepts a frame received by the switch 1, from the switch chip 13 as its input. The control unit 111 classifies the received frame based on information on the header and payload of the received frame and determines a process for the received frame based on the classification. The control unit 111 outputs the received frame to one of the switch chip 13, the virtual client unit 112, the virtual server unit 113, and the conversion unit 114 according to the type of process determined.

The control unit 111 also controls the virtual client unit 112, the virtual server unit 113, the conversion unit 114, the device information managing unit 115, the communication information managing unit 116, and the conversion information generating unit 117. Information exchange among the virtual client unit 112, the virtual server unit 113, the conversion unit 114, the device information managing unit 115, the communication information managing unit 116, and the conversion information generating unit 117 takes place by way of the control unit 111.

The control unit 111 also performs a substitute server selection process to select a client terminal which will serve as a substitute server for the file server 2 of which data is requested in a communication conversion process. The control unit 111 corresponds to the "determination unit" in an aspect of the invention.

In FIG. 4, frame flow is represented by solid lines and control by broken lines. Details of processes performed by the control unit 111 are illustrated in the flows of FIGS. 9, 10, 11A, 11B, 12A, 12B, and 13 described later.

Memory

The memory 12 maintains a device information table 121, a communication information recording table 122, a conversion information table 123, a MAC address table 124, a virtual client communication table 125, and a virtual server communication table 126. The MAC address table 124 is a table indicating correspondence between a port and the MAC address of a device connected with the port.

The device information table 121 will be described in detail below with FIG. 5. The communication information recording table 122 will be described in detail below with FIG. 7. The conversion information table 123 will be described in detail below with FIG. 8. The virtual client communication table 125 will be described in detail below. The virtual server communication table 126 will be described in detail below.

Device Information Managing Unit

The device information managing unit 115 manages the device information table 121 maintained in the memory 12. The device information table 121 maintains information on whether a device connected with the switch 1 requests a communication conversion process on data reading communication from the device.

FIG. 5 is a diagram illustrating an example of a device information table 121. A record of the device information table 121 includes the MAC address of the device connected with a port of the switch 1 and a substitution request flag. In the example illustrated in FIG. 5, device names, such as file server 2, client 10, are also indicated at the head of each record for the sake of description.

The MAC address field of the device information table 121 indicates the MAC address of the device being connected with the port of the switch 1.

The substitution request flag field of the device information table 121 is a flag that indicates whether the device identified by the corresponding MAC address field requests the switch 1 to perform the communication conversion process on communication for reading data from the device.

The substitution request flag field being "0" means that the device does not request the switch 1 to perform the communication conversion process on communication for reading data from the device. When the substitution request flag field is "0," the switch 1 relays data to the device as usual, without converting the communication for reading data from the device. In the substitution request flag field, "0" is stored as the initial value.

The substitution request flag field being "1" means that the device requests the switch 1 to perform the communication conversion process on communication for reading data from the device. When the substitution request flag field is "1," the switch 1 performs the communication conversion process to convert communication for reading data from the device into communication for reading data from the client terminal that has already read the same data from the device.

In the example of FIG. 5, the device information table 121 maintains records for the file server 2, the client terminal 10, the client terminal 20, and the client terminal 30 of the data distribution network system illustrated in FIG. 1.

In the MAC address field of the record for the file server 2, the MAC address of the file server 2 "XX-XX-XX-XX-XX-S2" is stored. The substitution request flag field of the record for the file server 2 is "1." The example of the device information table 121 illustrated in FIG. 5 thus indicates that the file server 2 requests the switch 1 for execution of the communication conversion process on communication for reading data from the file server 2.

In the MAC address field of the record for the client terminal 10, the MAC address of the client terminal 10 "XX-XX-XX-XX-XX-C1" is stored. The substitution request flag field of the record for the client terminal 10 is "0." Thus, the example of the device information table 121 illustrated in FIG. 5 indicates that the client terminal 10 does not request the switch 1 to perform the communication conversion process on communication for reading data from the client terminal 10.

When a device is connected with a port of the switch 1, the MAC address table 124 is updated. The device information managing unit 115 monitors the MAC address table 124 and generates and updates the device information table 121 based on the MAC address table 124.

When a substitution request frame is received, the device information managing unit 115 receives information on the substitution request frame received from the control unit 111. A substitution request frame is a frame used by client terminals and the file server 2 connected with the switch 1 for requesting or canceling the execution of the communication conversion process to the switch 1. The substitution request frame, which is predefined, uses the multicast MAC address for a PAUSE frame, for example, and employs a frame that is not transferred beyond the switch 1. The PAUSE frame is used in Ethernet (registered trademark) for interrupting frame transmission by a device receiving the PAUSE frame for a certain time period. The device information managing unit 115 updates the substitution request flag field of the device information table 121 to either "1" or "0" depending on the contents of the substitution request frame from the control unit 111.

Figure 6:
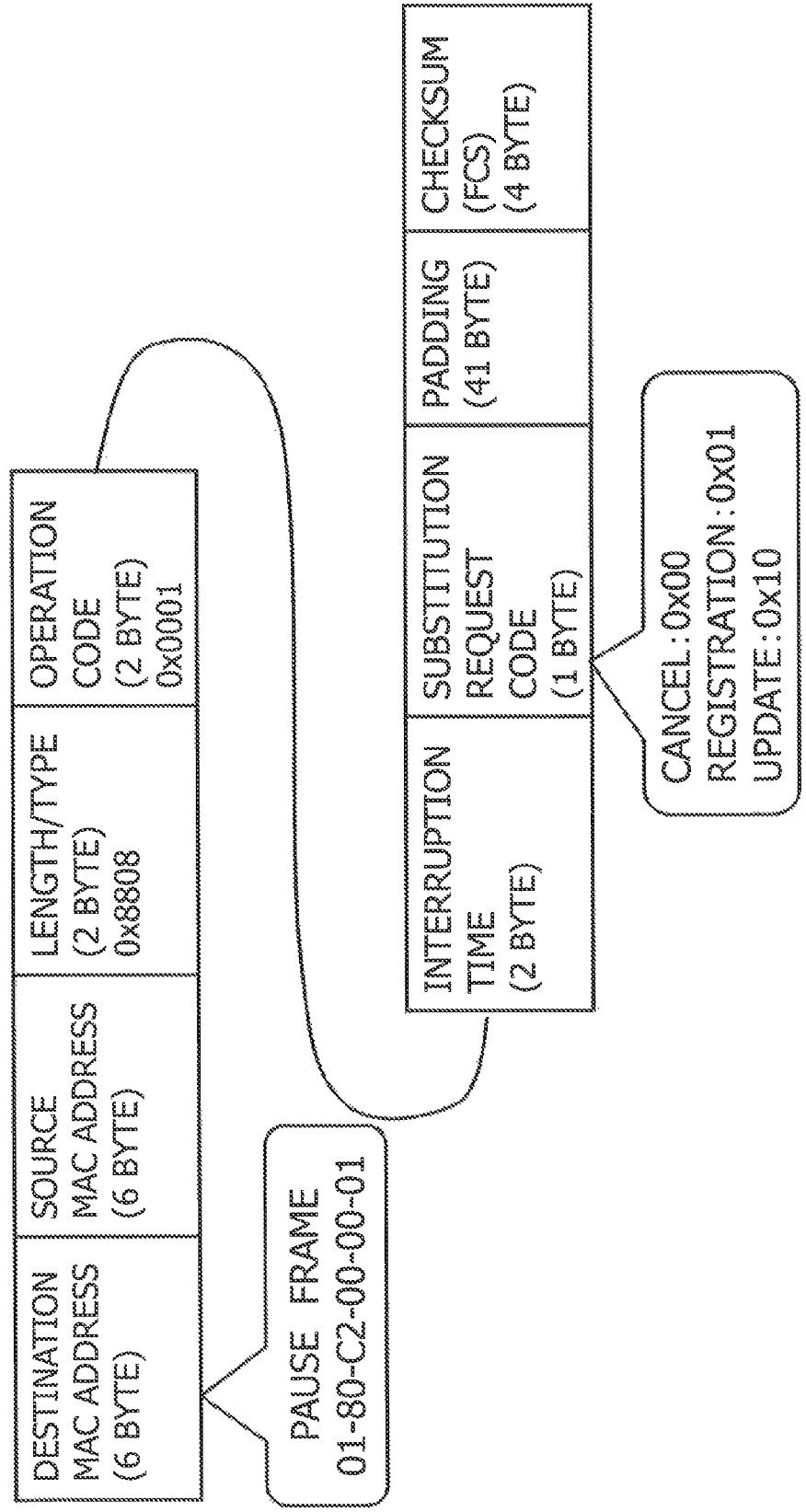
FIG. 6 is a diagram illustrating an example of a format of a substitution request frame.

FIG. 6 is a diagram illustrating an example of a format of the substitution request frame. FIG. 6 illustrates an example frame format for when the PAUSE frame is used as the substitution request frame.

The substitution request frame has the fields of "destination MAC address," "source MAC address," "length/type," "operation code," "interruption time," "substitution request code," "padding," and "checksum."

The destination MAC address field is 6 bytes. In the destination MAC address field, "00:80:C2:00:00:01", a multicast address reserved for the PAUSE frame, is stored.

The source MAC address field is 6 bytes. In the source MAC address field, the MAC address of a device sending the PAUSE frame is stored.

The length/type field is 2 bytes. As the PAUSE frame is a kind of MAC control frame, "0x8808," indicating it is a MAC control frame, is stored in the length/type field.

The destination MAC address, source MAC address, and length/type fields represent the header portion of an Ethernet frame.

The data portion of the Ethernet frame is 46 bytes. The data portion starts with the operation code field of 2 bytes. In the operation code field, an operation code for specifying a type of control is set. For the PAUSE frame, an operation code "0x0001" is set in the operation code field.

The 2-byte interruption time field follows the operation code field. In the interruption time field, a period of time for which frame transmission is paused at a device receiving the PAUSE frame is specified. When the PAUSE frame is used as a substitution request frame, "0" is set in the interruption time field, for example.

The 1-byte substitution request code field follows the interruption time field. The substitution request code field is set when the PAUSE frame is used as a substitution request frame. In the substitution request code field, a substitution request code is stored. The substitution request code is a code for specifying whether the device sending the substitution request frame requests the switch 1 to execute the communication conversion process or not.

A substitution request code "0x01" means that a substitution request frame is a registration request that asks the switch 1 for execution of the communication conversion process. A substitution request frame representing a registration request is sent, for example, when the file server 2 or a substitute server that sent the substitution request frame is experiencing a load exceeding a predetermined threshold. When the switch 1 receives the substitution request frame representing the registration request, the device information managing unit 115 sets "1" in the substitution request flag field of the record of the device information table 121 in which the value of the MAC address field matches the value of the source MAC address field of the substitution request frame. When the substitution request flag field of the device information table 121 is set to "1," the switch 1 executes the communication conversion process on communication for reading data from the device from then on.

A substitution request code "0x10" means that the substitution request frame is an update request that asks the switch 1 to execute the communication conversion process on all communications for reading data from the sending device. A substitution request frame representing an update request is sent when the file server 2 or a substitute server that sent the substitution request frame is experiencing a load exceeding a predetermined threshold and wants disconnection of all communications for data reading which is being processed, for example. When the switch 1 receives the substitution request frame representing the update request, the device information managing unit 115 sets "1" in the substitution request flag field of the record of the device information table 121 in which value of the MAC address field matches the value of the source MAC address field of the substitution request frame.

Further, the conversion information generating unit 117 sets "1" in the update flag field of the record of the conversion information table 123 in which the value of the substitute server MAC address field matches the value of source MAC address field of the substitution request frame. The conversion information generating unit 117 and the conversion information table 123 will be described in greater detail below with FIG. 8.

A substitution request code "0x00" means that the substitution request frame is a cancel request that asks the switch 1 to cancel the execution of the communication conversion process. A substitution request frame representing a cancel request is sent when load on the file server 2 or a substitute server that sent the substitution request frame has reduced below the predetermined threshold to enable the server to deliver data, for example. When the switch 1 receives the substitution request frame representing the cancel request, the device information managing unit 115 sets "0" in the substitution request flag field of the record of the conversion information table 123 in which the value of the MAC address field in the device information table 121 matches the value of source MAC address field of the substitution request frame. Also, the conversion information generating unit 117 of the switch 1 sets "0" in the update flag field of the record of the conversion information table 123 in which the value of substitute server MAC address field matches the value of the source MAC address field of the substitution request frame. The conversion information generating unit 117 and the conversion information table 123 will be described in greater detail below with FIG. 8.

The padding field of 41 bytes follows the substitution request code. As the minimum frame size is specified as 64 bytes with Ethernet (registered trademark), the padding field adjusts the size of the substitution request frame to the minimum size. The operation code, interruption time, substitution request code, and padding fields correspond to the data portion of the PAUSE frame.

At the end of the frame, the 4-byte checksum field is set as a trailer portion used for checking frame integrity. In the case of Ethernet frame, the checksum field is also called an FCS (Frame Check Sequence).

Although the example of FIG. 6 illustrates a substitution request frame format for when the PAUSE frame is used, the substitution request frame may be any frame that uses a multicast MAC address and is not transferred beyond the switch 1, instead of the PAUSE frame. In that case, the format of the substitution request frame includes the substitution request code field described above in addition to the original format adopted for the substitution request frame.

From FIGS. 5 and 6, it is seen that when the substitution request code field of a received substitution request frame is "0x01," it is a registration request. When the substitution request code field of the received substitution request frame is "0x10," it is an update request. When the substitution request frame represents a registration request or an update request, the device information managing unit 115 sets "1" in the substitution request flag field of the record of the device information table 121 in which the value of the MAC address field matches the value of the source MAC address field of the substitution request frame. When the substitution request code field of the received substitution request frame is "0x00," it is a cancel request. When the substitution request frame represents a cancel request, the device information managing unit 115 sets "0" in the substitution request flag field of the record of the device information table 121 in which the value of MAC address field matches the value of the source MAC address field of the substitution request frame.

When a substitution request frame representing a registration request is received, the switch 1 executes the communication conversion process on any subsequent communication for reading data from the device that sent the substitution request frame. When the substitution request frame is sent by a client terminal acting as a substitute server, the data reading communication that is already established before the substitution request frame representing the registration request is received and that is performed with the client as the substitute server will continue without conversion. However, when the substitution request frame is sent by the file server 2, the communication conversion process is performed on all communications to read data from the file server 2, including data reading communication that is already established before the substitution request frame representing the registration request is received. This will be described in greater detail below.

When a substitution request frame representing an update request is received, a communication conversion process is performed on all communications for reading data from the sending device of the substitution request frame, including data reading communication that is already established before the substitution request frame is received.

Communication Information Managing Unit

The communication information managing unit 116 manages the communication information recording table 122. The communication information managing unit 116 records communication information for identifying the client terminal that acquires data, the file server 2 from which the data is acquired, and the file acquired in data reading communication in the communication information recording table 122. When a recording target frame is received by the switch 1, the communication information managing unit 116 receives information on the received frame as recording target from the control unit 111 and records communication information in the communication information recording table 122. Recording target frames in the communication information recording table 122 are predefined. For example, frames including packets for an SMB or a CIFS, which are file sharing protocols, are defined as recording target in the communication information recording table 122. For example, a port number 445 is reserved for an SMB. Thus, when the control unit 111 detects that the port number field of a received frame is 445, indicating the SMB, it determines that the received frame is an SMB frame and thus a recording target frame.

FIG. 7 is a diagram illustrating an example of the communication information recording table 122. The communication information recording table 122 includes communication information for identifying the client terminal which acquires data, the file server 2 from which the data is acquired, and an acquired file in data reading communication relayed by the switch 1. The communication information recording table 122 corresponds to the storage unit.

A record of the communication information recording table 122 includes the fields of "client MAC address," "server MAC address, client IP address," "server IP address," "client file path, server file path," and "communication completion flag," for example.

The client MAC address field of a record of the communication information recording table 122 indicates the MAC address of a client terminal that requests data reading and acquires data. The client IP address field indicates the IP address of the client terminal that requests data reading and acquires data. The client file path field indicates a path at which the acquired file to be read is saved on the client terminal. The client file path also includes the file name of the acquired file to be read.

The server MAC address field indicates the MAC address of the server that distributes data in response to a data read request. The server IP address field indicates the IP address of the server that distributes data in response to a data read request. The server file path field indicates a path at which the file to be read is saved on the server. The server file path also includes the file name of the file to be read distributed to the client terminal.

The communication completion flag field indicates whether communication for a client to read the target file from the server recorded in a record of the communication information recording table 122 has finished or not. The communication completion flag field being "0" means the data reading communication recorded in the record is currently in progress. The communication completion flag field being "1" means the data reading communication recorded in the record has finished. The initial value of the communication completion flag field is "0."

In the example communication information recording table 122 of FIG. 7, the client MAC address and client IP address fields represent information for identifying the data recipient. The server MAC address and server IP address fields represent information for identifying the data providing device. Client file path and server file path represent information for identifying data relayed by the switch 1.

The first record of the communication information recording table 122 illustrated in FIG. 7 indicates the following matters. The client MAC address and client IP address fields indicate that the data recipient is client terminal 10 (the end of the MAC address is "C1"). The server MAC address and server IP address fields indicate that the data providing device is the file server 2 (the end of the MAC address is "S2"). The client file path field indicates the acquired file is "a.txt."

When determining that a received frame is a recording target frame, the control unit 111 analyzes the contents of the frame and sends the resulting information to the communication information managing unit 116. The communication information managing unit 116 generates and updates a record in the communication information recording table 122 based on the result of the analysis. For example, as port number "445" is reserved for an SMB, the MAC address and IP address of the server and the client can be identified by analyzing the destination or source port number included in the received frame as recording target. When the destination port number field of the received frame as recording target is 445, for example, the communication information managing unit 116 records the values of the destination MAC address and destination IP address fields of the received frame as the values of the server MAC address and server IP address fields, respectively, of the communication information recording table 122. In this case, the communication information managing unit 116 also records the values of the source MAC address and source IP address fields of the received frame as the values of the client MAC address and client IP address fields of the communication information recording table 122, respectively.

A generated record for the communication information recording table 122 is added to the communication information recording table 122 even if any field thereof lacks information at the time of generation. For example, information on the client file path and server file path fields of the communication information recording table 122 is often unknown in an early stage of the negotiation described in FIG. 2. Information will be added to a field lacking information in a record of the communication information recording table 122 by the communication information managing unit 116 when negotiation advances and information to be stored has become available.

The communication information managing unit 116 of the switch 1 sets "1" in the communication completion flag field of the corresponding communication record when a received frame as recording target is a reception completion response to final data, the reception completion response sent from the client terminal to the file server described in FIG. 2, for example. Whether a received frame as recording target is a reception completion response to final data or not can be determined from the value of the offset address or sequence number (see the description corresponding to FIG. 2) included in the received frame being maximum, for example.

When one single device is capable of distributing data such as the file server 2 as in the network illustrated in FIG. 1, the server MAC address, server IP address, and server file path fields of the communication information recording table 122 may be omitted.

Conversion Information Generating Unit

The conversion information generating unit 117 manages the conversion information table 123 by generating, updating, and deleting records thereof. The conversion information generating unit 117 records information for identifying a conversion target frame and details of frame conversion to the conversion information table 123.

FIG. 8 is a diagram illustrating an example of a conversion information table 123. The conversion information table 123 includes information for identifying a conversion target frame and information used for frame conversion in connection with communication conversion process. The conversion target frame includes one used for the file sharing protocol such as an SMB or a CIFS and identified by records of the conversion information table 123. The conversion information table 123 illustrated in FIG. 8 is an example configuration for when an SMB is used as the file sharing protocol.

The example conversion information table 123 illustrated in FIG. 8 is for the switch 1 of the data distribution network system illustrated in FIG. 1. The conversion information table 123 of FIG. 8 includes a record that indicates client terminal 10 is selected as the substitute server for communication to read a file "a.txt" from the file server 2 to the client terminal 30.

A record of the conversion information table 123 includes the fields of "client MAC address," "server MAC address," "substitute server MAC address," "client IP address," "server IP address," "substitute server IP address," "client file path," "server file path," "substitute server file path," "client port number," "server port number," "substitute server port number," "server file ID," "substitute server file ID," and "update flag."

The client MAC address field of the conversion information table 123 stores the MAC address of the client terminal of data reading communication as conversion target. The client IP address field stores the IP address of the client terminal of data reading communication as conversion target. The client file path field stores the saving location of a file to be read into the client terminal in data reading communication as conversion target. The client port number field stores the port number used by the client terminal in data reading communication as conversion target. In the example conversion information table 123 illustrated in FIG. 8, the MAC address and IP address of the client terminal 30 of the example data distribution network system illustrated in FIG. 1 are stored in the client MAC address and client IP address fields, respectively.

In the example of FIG. 8, "1071" is stored in the client port number field, indicating that the client terminal 30 uses the port number 1071.

The server MAC address field of the conversion information table 123 stores the MAC address of the server for data reading communication as conversion target. The server IP address field stores the IP address of the server for data reading communication as conversion target. The server file path field stores the path of a file to be read from the server in data reading communication as conversion target. The server port number field stores the port number used by the server in data reading communication as conversion target. The server file ID field stores the file ID assigned to the file to be read maintained on the server in relation to data reading communication as conversion target. In the example conversion information table 123 illustrated in FIG. 8, the MAC address and IP address of the file server 2 of the data distribution network system illustrated in FIG. 1 are stored in the server MAC address and server IP address fields, respectively. In the example of FIG. 8, "445" is stored in the server port number field, indicating that the file server 2 uses the port number reserved for an SMB. Also, the server file ID field is "0xc00f" in the example of FIG. 8, indicating that the file ID assigned to the file to be read maintained on the file server 2 is 0xc00f.

The substitute server MAC address field of the conversion information table 123 stores the MAC address of a client terminal selected as the substitute server for data reading communication as conversion target. The substitute server IP address field stores the IP address of the client terminal selected as the substitute server for data reading communication as conversion target. The substitute server file path field stores the path of the file to be read on the client terminal selected as the substitute server for data reading communication as conversion target. The substitute server port number field stores the port number used by the client terminal selected as the substitute server for data reading communication as conversion target. The server file ID field stores the file ID assigned to the file to be read maintained on the client terminal selected as the substitute server for data reading communication as conversion target. In the example conversion information table 123 illustrated in FIG. 8, the substitute server MAC address and substitute server IP address fields maintain the MAC address and IP address of the client terminal 10 acting as the substitute server, respectively. In the example illustrated in FIG. 8, "445" is stored in the substitute server port number field, indicating that the client terminal 10 acting as the substitute server uses the port number reserved for an SMB. Also, "0xc00f" is stored in the substitute server file ID field in the example illustrated in FIG. 8, indicating that the file ID assigned to the file to be read maintained on the client terminal 10 acting as the substitute server is "0xc00f."

The update flag field of the conversion information table 123 stores a flag indicating whether the client terminal selected as the substitute server for the data reading communication as conversion target identified by the record is able to perform data reading communication or not. The update flag field being "0" means that the substitute server of the record is able to perform data reading communication. The update flag field being "1" means that the substitute server of the record is unable to perform data reading communication. The initial value of the update flag field is "0." In the example conversion information table 123 illustrated in FIG. 8, the update flag field is "0," indicating that the client terminal 10 acting as the substitute server can perform data reading communication.

Each record of the conversion information table 123 is generated when communication for reading data from the file server 2 to a client terminal is first received after the switch 1 received a communication conversion process request from the file server 2, for example. For example, a record of the conversion information table 123 is generated when "1" is stored in the substitution request flag field for the file server 2 in the device information table 121 and communication for reading data from the file server 2 to a client terminal is first received. A record of the conversion information table 123 is added to the conversion information table 123 even if any field thereof lacks information at the time of generation. In a record of the conversion information table 123, at least the MAC address, IP address, port number, and file path of the client, server, and substitute server may be stored at the time of generation. For example, "file ID" may lack information when a record is generated in the conversion information table 123, and information will be added to the record when it has become available.

Record generation in the conversion information table 123 will be described below assuming a case where the port number "445," reserved for an SMB, is stored in the destination port number field of a received frame when a record is generated in the conversion information table 123, for example.

The port number "445," reserved for an SMB, being stored in the destination port number field of the received frame indicates that the received frame is sent by a client terminal and is addressed to the file server 2 operating as the server. The conversion information generating unit 117 takes the values of the destination MAC address, destination IP address, and destination port number fields of the received frame as the values for the server MAC address, server IP address, and server port number fields of the record of the conversion information table 123. The conversion information generating unit 117 takes the values of the source MAC address, source IP address, and source port number fields of the received frame as the values for the client MAC address, client IP address, and client port number fields of the record of the conversion information table 123, respectively.

When a substitute server is selected by the control unit 111, the conversion information generating unit 117 extracts a record for communication through which the client terminal selected as the substitute server acquires the target file from the file server 2, i.e. the destination of the received frame, from the communication information recording table 122. In the record extracted from the communication information recording table 122 here, the values of client MAC address and client IP address fields are the MAC address and IP address of the client terminal selected as the substitute server. In the extracted record of the communication information recording table 122, the values of server MAC address and server IP address fields are the MAC address and IP address of the file server 2 to which the received frame is addressed. In the extracted record of the communication information recording table 122, the file name included in the client file path and server file path fields represents the target file. In the extracted record of the communication information recording table 122, "1" is stored in the communication completion flag field. Information on the file to be read is acquired through analysis of the received frame or provided by the virtual server unit 113. A client terminal to serve as the substitute server is selected by the control unit 111. The virtual server unit 113 will be described in detail later. Selection of a client terminal to serve as the substitute server by the control unit 111 will be described in detail later.

The conversion information generating unit 117 acquires the values of the client MAC address, client IP address, and client file path fields of the extracted record of the communication information recording table 122 as the values of substitute server MAC address, substitute server IP address, substitute server file path fields of the conversion information table 123, respectively.

The conversion information generating unit 117 acquires the value of server file path field of the extracted record of the communication information recording table 122 as the value of server file path field of the conversion information table 123.

The conversion information generating unit 117 also acquires the value for client file path field of the conversion information table 123 from the target file saving path field included in the received frame, which is a frame for communication to read data from the file server 2. When the value is not acquired from the received frame, the conversion information generating unit 117 retrieves the saving location of the target file from the virtual server unit 113, which acquires information on the target file from the client terminal, and stores the location in the client file path field of the conversion information table 123.

Since a device to serve as the server in data reading communication uses a reserved port number, for example, the same number as the "server port number" of the relevant record is stored in the substitute server port number field of the conversion information table 123.

When the switch 1 receives a substitution request frame representing an update request, the conversion information generating unit 117 sets "1" in the update flag field of the record of the conversion information table 123 in which the value of the substitute server MAC address field matches the value of the source MAC address field of the substitution request frame, for example. When the switch 1 receives a substitution request frame representing a cancel request, the conversion information generating unit 117 sets "0" in the update flag field of the record of the conversion information table 123 in which the value of the substitute server MAC address field matches the value of the source MAC address field of the substitution request frame, for example.

The conversion information table 123 is used for identifying a received frame as conversion target. The control unit 111 analyzes the contents of a received frame and compares the contents of the received frame with the records of the conversion information table 123. If there is a matching record, it determines that the received frame is a conversion target frame.

For example, the control unit 111 determines that the received frame is a conversion target frame when the values of at least destination MAC address, destination IP address, destination port number, source MAC address, source IP address, and source port number fields of the received frame respectively match the values of server MAC address, server IP address, server port number, client MAC address, client IP address, and client port number fields of a record of the conversion information table 123.

Also, the control unit 111 determines that the received frame is a conversion target frame when the values of at least destination MAC address, destination IP address, destination port number, source MAC address, source IP address, and source port number fields of the received frame respectively match the values of client MAC address, client IP address, client port number, substitute server MAC address, substitute server IP address, and substitute server port number fields of a record of the conversion information table 123, for example.

The conversion information generating unit 117 deletes a record of the conversion information table 123 when data reading communication identified by the record has finished or when the substitute server has been changed, for example.

Conversion Unit

The conversion unit 114 converts a frame sent from a client terminal to a file server into a frame to be sent from the client terminal to the substitute server for the file server, or converts a frame sent from the substitute server to the client terminal into a frame to be sent from the file server to the client terminal.

The conversion unit 114 converts a received frame in accordance with the conversion information table 123 when the received frame is determined to be a conversion target frame by the control unit 111. For example, when the received frame as conversion target is sent by the client terminal 30 and is addressed to the file server 2, the conversion unit 114 rewrites the values of the destination MAC address, destination IP address, destination port number, and target file source path fields of the received frame as the values indicated by substitute server MAC address, substitute server IP address, substitute server port number, substitute server file path of the corresponding record of the conversion information table 123. Thereby, a frame for communication for the client terminal 30 to read the target file from the file server 2 is converted into a frame for communication to read the target file from the substitute server to the client terminal 30.

For example, when the received frame as conversion target is sent by the client terminal 10 serving as the substitute server and is addressed to the client terminal 30, the conversion unit 114 rewrites the values of source MAC address, source IP address, source port number, target file source path fields of the received frame as the values of the server MAC address, server IP address, server port number, and server file path fields of the corresponding record of the conversion information table 123.

The conversion unit 114 outputs the converted frame to the switch chip 13. The converted frame is output from the switch 1 via the switch chip 13.

Virtual Client Unit

When instructed by the control unit 111, the virtual client unit 112 masquerades as the client terminal that requests data reading, to the file server 2 or the client terminal selected as the substitute server. For example, the virtual client unit 112 conducts negotiation such as described in the example illustrated in FIG. 2, including connection establishment and acquisition of information on the file to be read, by masquerading as the client terminal that requests data reading, to the file server 2 or the client terminal selected as the substitute server. Information on the file to be read includes the path and file ID of the target file on the file server 2, for example. Information acquired by the virtual client unit 112 from the file server 2 or the client terminal selected as the substitute server is sent to the control unit 111.

For example, when a communication conversion process is started on data reading communication from a client terminal to the file server 2, the control unit 111 selects a client terminal to serve as the substitute server. The control unit 111 instructs the virtual client unit 112 to masquerade as the client terminal to the substitute server.

The virtual client unit 112 masquerades as a client terminal by using the MAC and IP addresses of the client terminal, for example. Information needed for masquerading as a client terminal, such as its MAC and IP addresses, can be obtained from a received frame.

When starting a process by masquerading as a client terminal, the virtual client unit 112 records communication between the client terminal and the file server 2 or substitute server in the virtual client communication table 125. The virtual client communication table 125 includes information identifying frames for communication being performed by the virtual client unit 112 masquerading as a client terminal. For example, the MAC address, IP address, and port number of the client terminal the virtual client unit 112 is masquerading as and the relevant file server 2 or substitute server are recorded in the virtual client communication table 125, in the same structure as the communication information recording table 122, for example. For example, when the MAC address, IP address, and port number of the destination and the source of the received frame match a record of the virtual client communication table 125, the control unit 111 outputs the received frame to the virtual client unit 112. The virtual client unit 112 deletes the relevant record from the virtual client communication table 125 when the process involving masquerading as the client terminal ends.

Virtual Server Unit

When instructed by the control unit 111, the virtual server unit 113 masquerades as the file server 2 with which data reading communication is performed, to the client terminal requesting data reading. For example, the virtual server unit 113 conducts negotiation as described in the example of FIG. 2 masquerading as the file server 2 to acquire information on the target file, such as the name of the file to be read and the path of the target file on the file server 2, from the client terminal. The virtual server unit 113 masquerades as the file server 2 by using the MAC and IP addresses of the file server 2, for example. Information needed for masquerading as the file server 2, such as its MAC and IP addresses, can be obtained from a received frame. The virtual server unit 113 sends information on data reading communication acquired from a client terminal by masquerading as the file server 2 to the control unit 111.

When starting a process by masquerading as the file server 2, the virtual server unit 113 records communication between the file server 2 it is masquerading as and a client terminal in the virtual server communication table 126. The virtual server communication table 126 includes information identifying frames for communication being performed by the virtual server unit 113 masquerading as the file server. For example, the MAC address, IP address, and port number of the file server 2 the virtual server unit 113 is masquerading as and the relevant client terminal are recorded in the virtual server communication table 126, in the same structure as the communication information recording table 122, for example. For example, when the MAC address, IP address, and port number of the destination and the source of a received frame match a record of the virtual server communication table 126, the control unit 111 outputs the received frame to the virtual server unit 113. The virtual server unit 113 deletes the relevant record from the virtual server communication table 126 when the process involving masquerading as the file server 2 ends.

Communication performed by the switch 1 masquerading as the file server 2 or a client terminal will be hereinafter referred to as a "masquerading communication."

File Server

The file server 2 is a server to have files of software or the like to be set up in client terminals and distribute file data to client terminals, for example. The file server 2 has server services for the same file sharing protocol as client terminals, such as an SMB or a CIFS, and provides data distribution services as demanded by client terminals, for example.

The file server 2 has a predetermined threshold established for load imposed on it, for example, such that it does not execute data reading communication when load exceeds the predetermined threshold. The file server 2 measures average throughput, CPU usage, memory usage, average reading rate of HDDs, for example, to monitor the load imposed on it.

When load exceeds the predetermined threshold, the file server 2 requests a communication conversion process. The file server 2 requests the communication conversion process by sending a substitution request frame representing a registration request such as illustrated in FIG. 6, for example. After requesting the communication conversion process to the switch 1, the communication conversion process is performed in the switch 1, so data reading communication will no longer reach the file server 2.

When load imposed on the file server 2 has dropped below the predetermined threshold to enable it to handle data reading communication, the file server 2 requests cancel of the communication conversion process. The file server 2 requests cancel of the communication conversion process by sending a substitution request frame representing a cancel request such as illustrated in FIG. 6, for example.

Client Terminal

The client terminals 10, 20, 30, 40, and 50 use the same file sharing protocol as the file server 2 to read files from the file server 2.

At least one of the client terminals 10, 20, 30, 40, and 50 has server services for the file sharing protocol that is common to the file server 2 and can act as the substitute server. For example, when the client terminal 50 does not have the server services, it would not be able to respond to negotiation from the switch 1 masquerading as a client terminal. As a result, the negotiation between the switch 1 and the client terminal 50 would fail and the client terminal 50 is not selected for the substitute server.

A client terminal having the server services is able to act as the substitute server. When a client terminal acts as a substitute server, it measures average throughput, CPU usage, memory usage, average reading rate of HDDs, for example, to monitor load imposed on it. When load exceeds a predetermined threshold, the client terminal requests a communication conversion process on communication it is performing as the substitute server. The client terminal acting as the substitute server requests the communication conversion process by sending a substitution request frame representing a registration or update request such as illustrated in FIG. 6, for example.

The client terminal acting as the substitute server selects whether to send a registration request or an update request depending on its load conditions, for example. When a registration request is sent, data reading communication with the client terminal acting as the substitute server that is already established before sending the registration request will continue. When an update request is sent, all data reading communications with the substitute server, including data reading communication with the client terminal acting as the substitute server that is already established before sending the update request, will be converted to communication with another device.

The client terminal acting as the substitute server may also send a substitution request frame for a registration request and then a substitution request frame for a cancel request, thereby limiting execution of data reading communication in stages.

When load on the client terminal acting as the substitute server has lowered below a predetermined threshold to enable it to accept data reading communication, the client terminal requests cancel of the communication conversion process. The client terminal acting as the substitute server requests cancel of the communication conversion process by sending a substitution request frame representing a cancel request such as illustrated in FIG. 6, for example.

Hardware of File Server and Client Terminals

The file server 2 can be implemented using a generic computer such as a PC or a dedicated computer such as a server machine.

The client terminals 10, 20, 30, 40, and 50 can be implemented using a PC, a workstation, a PDA (Personal Digital Assistant), or an electronic device containing electronics such as a gaming machine and an HDD recorder.

A computer or an information processing device includes a processor, a main storage, an auxiliary storage, and a device for interfacing with peripherals, such as a communication interface device. The main storage and the auxiliary storage are computer-readable recording media.

The computer implements functions adapted for a certain purpose by the processor loading a program stored in a recording medium into a work area of the main storage and executing it, so that peripherals are controlled through execution of the program.

The processor may be a CPU or a DSP (Data Signal Processor), for example. The main storage includes a RAM (Random Access Memory) or a ROM (Read Only Memory), for example. The auxiliary storage may be an EPROM (Erasable Programmable ROM) or hard disk drive (Hard Disk Drive), for example. The auxiliary storage may include a removable or portable recording medium. The removable medium can be a USB (Universal Serial Bus) memory, or a disk recording medium such as a CD (Compact Disc) and a DVD (Digital Versatile Disc).

The communication interface device may be a LAN (Local Area Network) interface board or a wireless communication circuit for wireless communication, for example.

Peripherals include input devices such as a keyboard and a pointing device and output devices such as a display and a printer. Input devices include input/output devices for video or images, such as a camera, and audio input devices such as a microphone. Output devices may include audio output devices, such as a speaker.

Process Performed Upon Receiving a Frame in Switch

FIGS. 9, 10, 11A, 11B, 12A, 12B and 13 are diagrams illustrating example flows of a process performed when the switch 1 receives a frame.

Classification of a Received Frame

Figure 9:
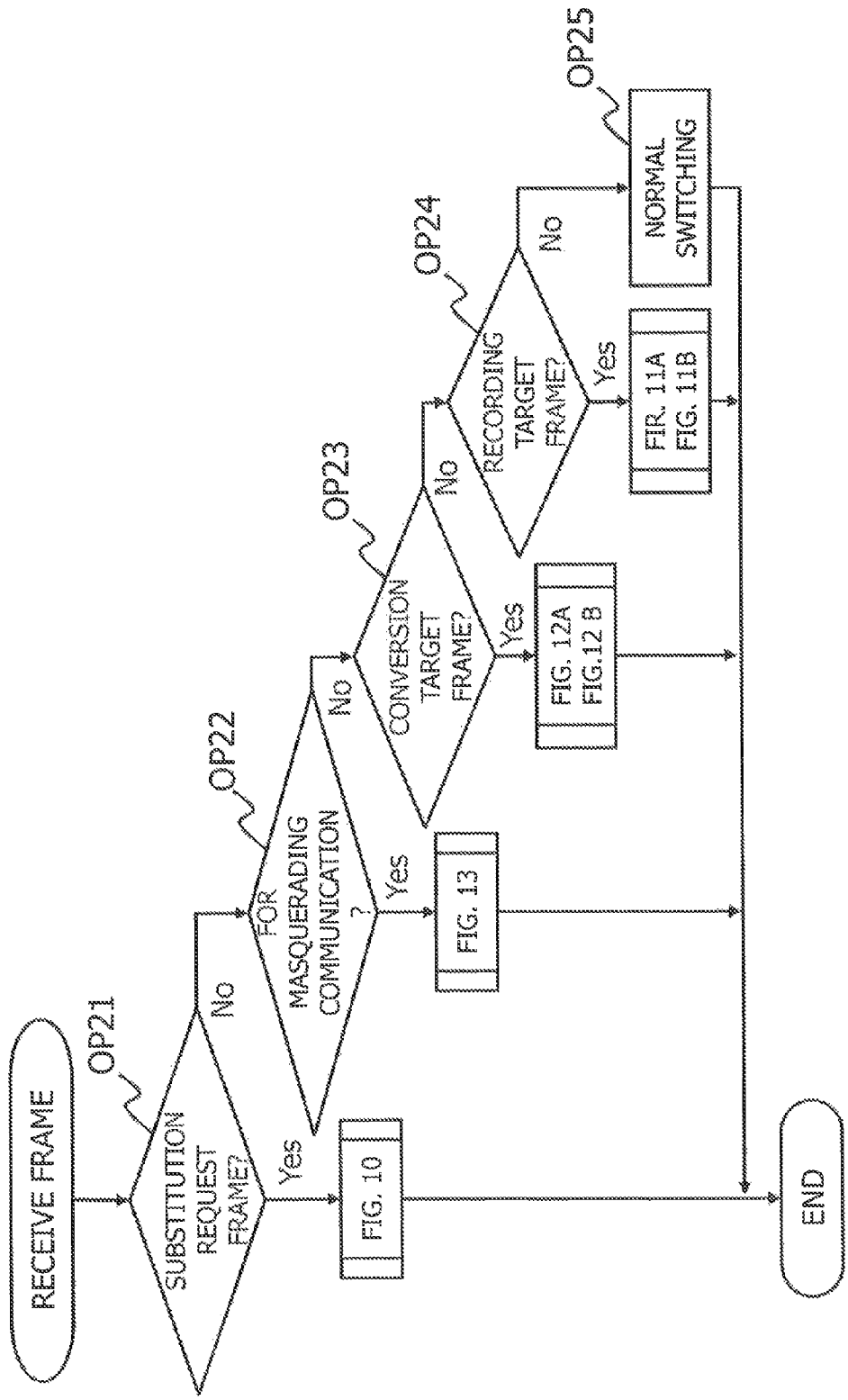
FIG. 9 is a diagram illustrating an example of a flow of a process for classifying a received frame upon a switch receiving a frame.

FIG. 9 is a diagram illustrating an example flow of a process for the switch 1 to classify a received frame upon receiving one.

When the switch 1 receives the frame, the frame is input to the CPU 11 via the interface 15, the PHY chip 14, and the switch chip 13. In the CPU 11, the received frame is first classified by the control unit 111.

The control unit 111 determines whether the received frame is a substitution request frame or not (OP 21). The control unit 111 makes this determination based on information on the header and payload of the frame. For example, when the substitution request frame is defined by the PAUSE frame, the received frame is determined to be a substitution request frame if the multicast MAC address used with the PAUSE frame is stored in the destination MAC address field of the received frame.

If the received frame is determined to be a substitution request frame (OP 21: Yes), the process proceeds to the flow illustrated in FIG. 10.

If the received frame is not a substitution request frame (OP 21: No), the control unit 111 determines whether the received frame is a frame for masquerading communication (OP 22). The control unit 111 analyzes the received frame and compares the contents of the received frame with the virtual client communication table 125 and the virtual server communication table 126. If the received frame matches a record of the virtual client communication table 125 or virtual server communication table 126, the control unit 111 determines that the received frame is a frame for masquerading communication.

If the received frame is determined to be a frame for masquerading communication (OP 22: Yes), the process proceeds to the flow illustrated in FIG. 13.

If the received frame is neither a substitution request frame nor a frame for masquerading communication (OP 22: No), the control unit 111 determines whether the received frame is a conversion target frame (OP 23). The control unit 111 compares the values of source MAC address, destination MAC address, source IP address, destination IP address, source port number, and destination port number fields of the received frame with the records of the conversion information table 123. If there is a matching record in the conversion information table 123 (OP 23: Yes), the received frame is a conversion target frame, upon which the process proceeds to the flow of FIG. 12A.

If the received frame is none of a substitution request frame, a frame for masquerading communication, or a conversion target frame (OP 23: No), the control unit 111 determines whether the received frame is a recording target frame (OP 24). The control unit 111 determines whether the received frame is a frame for the predefined protocol used in data reading communication, such as an SMB. The control unit 111 determines whether the received frame is an SMB frame and hence a recording target frame by checking whether the value of the destination port number or source port number field of the received frame is "445," the reserved number for SMB, for example. If the received frame is a recording target frame (OP 24: Yes), the process proceeds to the flow of FIG. 11A.

If the received frame is none of a substitution request frame, a frame for masquerading communication, a conversion target frame, or a recording target frame (OP 24: No), the control unit 111 outputs the received frame to the switch chip 13. The received frame that is not a substitution request frame, a frame for masquerading communication, a conversion target frame, or a recording target frame undergoes a normal switching process in the switch chip 13 and is output from the switch 1 (OP 25).

Process Performed when Substitution Request Frame is Received

Figure 10:
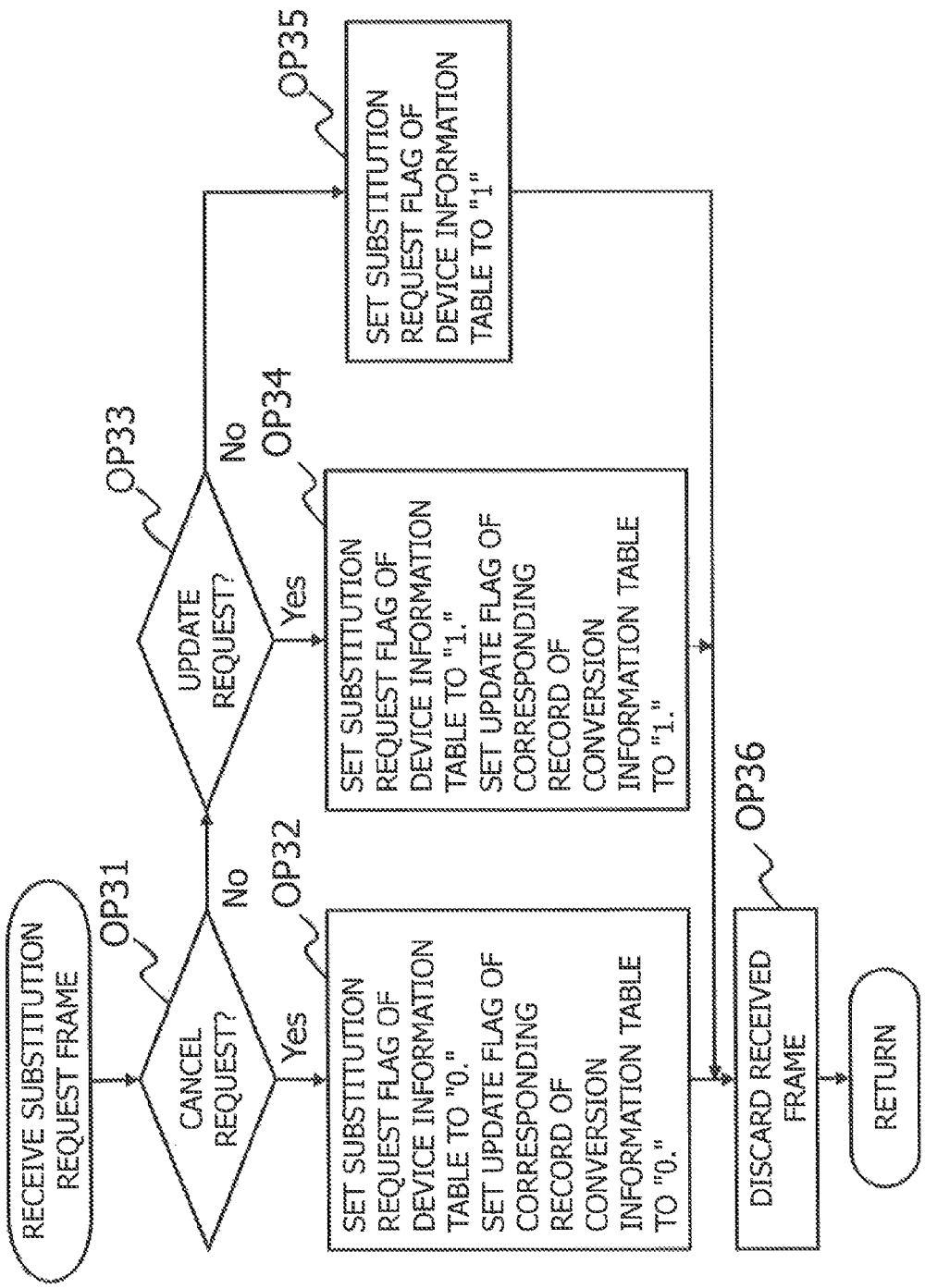
FIG. 10 is a diagram illustrating an example of a flow of a process for when the switch receives a substitution request frame.

FIG. 10 is a diagram illustrating an example of a flow of a process performed when the switch 1 receives a substitution request frame. The control unit 111 starts the process of FIG. 10 when determining the received frame is a predefined substitution request frame.

The control unit 111 determines whether the received substitution request frame represents a cancel request (OP 31). For example, when the substitution request frame is defined by the PAUSE frame illustrated in FIG. 6, the control unit 111 determines whether the value of the substitution request code field of the received frame, i.e., a substitution request frame, is "0x00," indicative of a cancel request. If the received substitution request frame represents a cancel request (OP 31: Yes), the control unit 111 has the device information managing unit 115 set "0" in the substitution request flag field of the record of the device information table 121 in which the value of the MAC address field matches the value of source MAC address field of the received frame (OP 32). The value of the substitution request flag field of the corresponding record of the device information table 121 becoming "0" causes cancelling of the communication conversion process on the device that sent the received frame which is the substitution request frame. When the conversion information table 123 has a record in which the value of the substitute server MAC address field matches the value of the source MAC address field of the substitution request frame representing a cancel request, for example, the control unit 111 has the conversion information generating unit 117 set "0" in the update flag field of that record. Thereafter, the received frame as a substitution request frame is discarded (OP 36), upon which the process ends.

If the received substitution request frame does not represent a cancel request (OP 31: No), the control unit 111 determines whether the substitution request frame represents an update request (OP 33). For example, when the substitution request frame is defined by the PAUSE frame illustrated in FIG. 6, the control unit 111 determines whether the value of the substitution request code field of the received substitution request frame is "0x10," indicative of an update request.

If the received substitution request frame represents an update request (OP 33: Yes), the control unit 111 has the device information managing unit 115 set "1" in the substitution request flag field of the record of the device information table 121 in which the value of MAC address field matches the value of source MAC address field of the received substitution request frame (OP 34). The control unit 111 also has the conversion information generating unit 117 set "1" in the update flag field of the record of the conversion information table 123 in which the value of substitute server MAC address field matches the value of source MAC address field of the received substitution request frame representing an update request (OP 34). Thereafter, the received frame as a substitution request frame is discarded (OP 36), upon which the process ends.

If the received substitution request frame is not a cancel request or an update request (OP 33: No), then the received substitution request frame is a registration request. If the received substitution request frame is a registration request, the control unit 111 has the device information managing unit 115 set "1" in the substitution request flag field of the record of the device information table 121 in which the value of the MAC address field matches the value of source MAC address field of the received substitution request frame (OP 35). Thereafter, the received frame as a substitution request frame is discarded (OP 36), upon which the process ends.

Process Performed when Frame Subject to Recording is Received

Figure 11A:
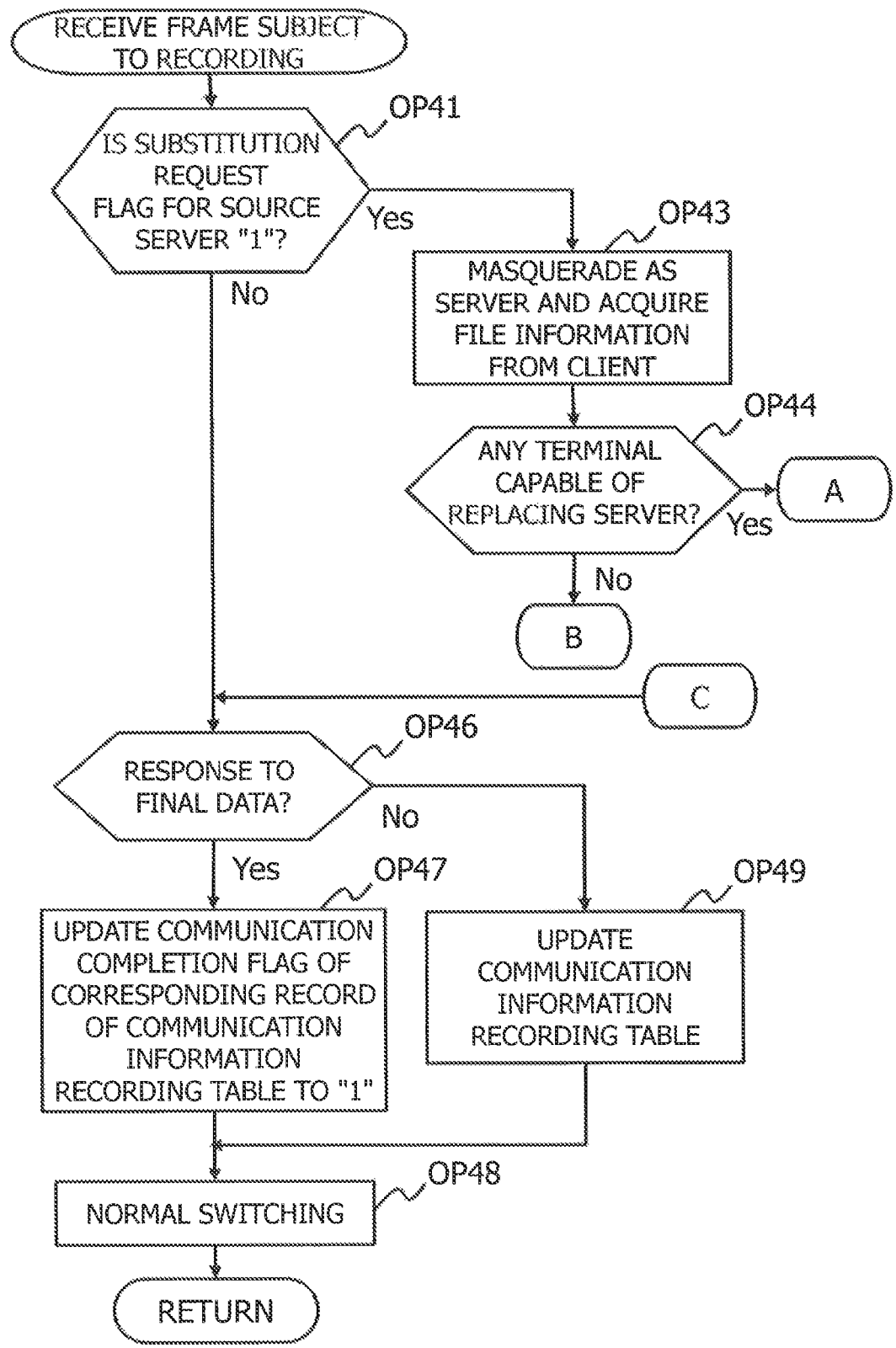
FIG. 11A is a diagram illustrating an example of a flow of a process for when the switch receives a recording target frame.
Figure 11B:
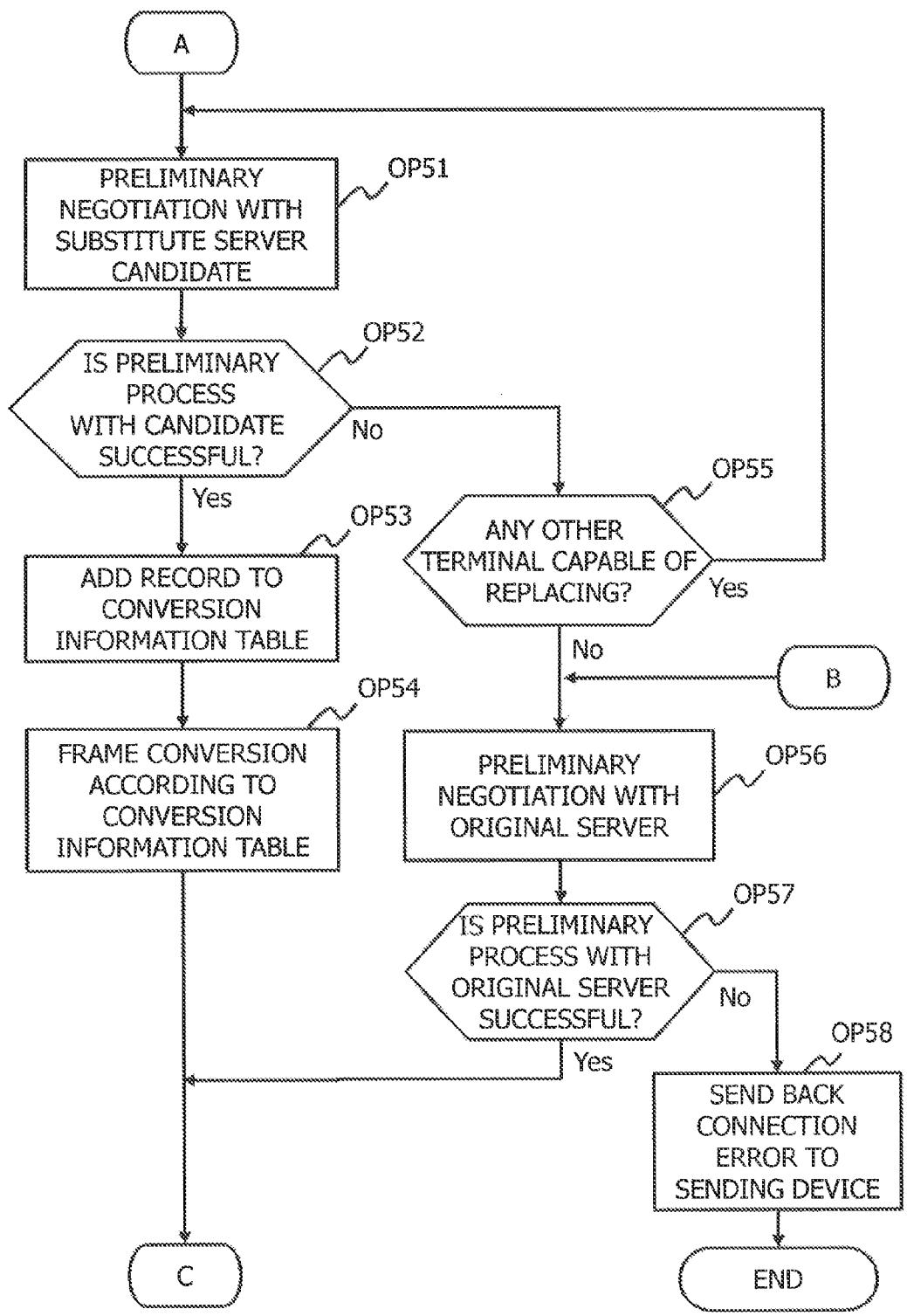
FIG. 11B is a diagram illustrating an example of a flow of a process for when the switch receives a recording target frame.

FIGS. 11A and 11B are diagrams illustrating an example of a flow of a process performed when the switch 1 receives a recording target frame. As recording target frame, a frame for the protocol used in data reading communication, such as an SMB or a CIFS, is defined, for example. The control unit 111 determines that a received frame is recording target when the received frame is not conversion target or for masquerading communication and the value of either the destination port number or source port number field of the received frame is "445," the number reserved for an SMB, for example.

The control unit 111 identifies the server that is the destination of the data request based on the received frame as recording target, and determines whether the value of the substitution request flag field of the record of the device information table 121 in which the value of the MAC address field matches the MAC address of the server is "1" (OP 41). That is, the control unit 111 determines whether the server as the destination of the data request identified by the received frame as recording target requests a communication conversion process. For example, when the value of the destination port number field of the received frame as recording target is "445," a number used for an SMB, the control unit 111 identifies the server as the destination of the data request with reference to the value of the destination MAC or destination IP address field of the received frame, for example. The control unit 111 then determines whether the value of the substitution request flag field of the record of the device information table 121 in which the value of the destination MAC address field of the received frame as recording target matches the value of MAC address field of the device information table 121 is "1."

If "0" is set in the substitution request flag field of the record of the device information table 121 in which the value of the MAC address field matches the MAC address of the server as the destination of the data request indicated by the received frame as recording target (OP 41: No), it means the server does not request a communication conversion process to the switch 1. The control unit 111 determines whether the received frame as recording target represents a reception completion response to final data (see FIG. 2) of data reading communication (OP 46).

If the received frame as recording target is a reception completion response to final data (OP 46: Yes), the control unit 111 has the communication information managing unit 116 update the value of the communication completion flag field of the corresponding record of the communication information recording table 122 to "1" (OP 47). A record of the communication information recording table 122 that corresponds to the received frame is a record in which the values of the client MAC address, server MAC address, client IP address, server IP address, client file path, server file path fields match the combination of the MAC addresses, IP addresses, and file paths of the destination and source of the received frame.

The control unit 111 outputs the received frame as recording target to the switch chip 13. The received frame as recording target undergoes a normal switching process in the switch chip 13 and is output from the switch 1 (OP 48). The processing then ends.

If the received frame as recording target is not a reception completion response for final data of data reading communication (OP 46: No), the control unit 111 has the communication information managing unit 116 update the communication information recording table 122 (OP 49). The communication information recording table 122 is updated based on the contents of the received frame as recording target. For example, when the communication information recording table 122 does not have a record that matches the communication between the destination and source indicated by the received frame subject to recording, the communication information managing unit 116 generates a record of the communication information recording table 122 based on the received frame. At the time of generation, the record of the communication information recording table 122 may contain unknown information. In addition, when the communication information recording table 122 has a record that matches the communication between the destination and source indicated by the received frame as recording target, the communication information managing unit 116 updates the record. For example, if information on a field that is unknown at the time of generation, such as client file path, is available from the received frame as recording target, the communication information managing unit 116 updates the record by adding the information to it. The received frame as recording target then undergoes a normal switching process in the switch chip 13 and is output from the switch 1, upon which the process ends (OP 48).

If in OP 41, "1" is stored as the value of the substitution request flag field of the record of the device information table 121 in which the value of the MAC address field matches the MAC address of the server as the data source indicated by the received frame subject to recording (OP 41: Yes), it means the server requests a communication conversion process. The control unit 111 has the virtual server unit 113 masquerade as the server as the data source indicated by the received frame as recording target and acquire information on the target file from the client terminal which is the destination of data indicated by the received frame as recording target (OP 43). In doing so, the virtual server unit 113 records the communication it performs by masquerading as the data source server to the virtual server communication table 126. Upon acquiring information on the target file from the client terminal which is the destination of data indicated by the received frame, the virtual server unit 113 reports the information on the acquired target file to the control unit 111. When the communication performed by the virtual server unit 113 masquerading as the data source server ends, the virtual server unit 113 deletes the relevant record from the virtual server communication table 126.

The control unit 111 determines whether there is any client terminal that can replace the data source server indicated by the received frame as recording target based on the target file information reported by the virtual server unit 113 (OP 44).

The control unit 111 extracts client terminals for which the values of at least server MAC address and server file path fields of the communication information recording table 122 match the MAC address of the source server indicated by the received frame as recording target and the file to be read and for which the value of the communication completion flag field is "1." The control unit 111 then determines whether any of the extracted client terminals has "0" in the substitution request flag field in the device information table 121. In this way, the control unit 111 determines whether there is any client terminal that can replace the data source server.

If there is a client terminal that can replace the data source server indicated by the received frame as recording target (OP 44: Yes), the control unit 111 selects a substitute server candidate. For example, the control unit 111 selects a client terminal as the substitute server candidate for which the value of the substitution request flag field of the device information table 121 is "0" from client terminals extracted from the communication information recording table 122 for the substitute server candidate as in OP 44. When there is more than one substitute server candidate, the control unit 111 selects a client terminal having the smallest MAC address among the extracted client terminals as the substitute server candidate, for example.

The control unit 111 has the virtual client unit 112 masquerade as the client terminal which is the destination of data indicated by the received frame as recording target and conduct negotiation described in FIG. 2, for example, with the client terminal selected as the substitute server candidate (OP 51). The virtual client unit 112 records the communication with the substitute server candidate it performs by masquerading as the client terminal representing the data destination indicated by the received frame as recording target in the virtual client communication table 125. The virtual client unit 112 masquerades as the data destination client terminal to establish a connection with the client terminal selected for the substitute server candidate, and acquire information on the file to be read from the client terminal. When the communication performed by the virtual client unit 112 masquerading as the data destination client terminal indicated by the received frame as recording target ends, the virtual client unit 112 deletes the relevant record from the virtual client communication table 125.

When the negotiation with the client terminal as the substitute server candidate is successful (OP 52: Yes), the control unit 111 determines the candidate client terminal as the substitute server. Information on the substitute server resulting from the negotiation is reported to the control unit 111.

The control unit 111 has the conversion information generating unit 117 generate a record of the conversion information table 123 for converting frames for communication to read the target file from the server to the client terminal indicated by the received frame as recording target (OP 53). Into the client MAC address, client IP address, client file path, and client port number fields of the generated record of the conversion information table 123, the MAC address, IP address, data destination file path and port number of the client terminal as the reading destination indicated by the received frame are stored. Into the server MAC address, server IP address, server file path, and server port number fields of the record of the conversion information table 123, the MAC address, IP address, data source file path and port number of the data source server indicated by the received frame are stored. Into the substitute server MAC address, substitute server IP address, substitute server file path, and substitute server port number fields of the record of the conversion information table 123, the values of client MAC address, client IP address, and client file path fields of the record of the communication information recording table 122 corresponding to the communication between the client terminal selected for the substitute server and the data source server indicated by the received frame are stored. The record of the conversion information table 123 generated here makes the received frame a recording target frame and a conversion target frame.

When a new record is added in the conversion information table 123, the control unit 111 outputs the received frame that is now recording target and also conversion target to the conversion unit 114 and has the conversion unit 114 convert the received frame. Upon receiving the received frame, the conversion unit 114 converts the received frame by rewriting information on its destination or source of the received frame according to the conversion information table 123 (OP 54). For example, when the destination of the received frame indicates the data source server, the conversion unit 114 rewrites the values of the destination MAC address, destination IP address, destination port number, target file path, and file ID fields of the received frame as the values of the substitute server MAC address, substitute server IP address, substitute server port number, substitute server file path, and substitute server file ID fields of the corresponding record of the conversion information table 123. Thereafter, the process continues at OP 46.

When the received frame as recording target is a reception completion response to final data (OP 46: Yes), the control unit 111 has the communication information managing unit 116 set "1" in the communication completion flag field of the corresponding record of the communication information recording table 122 (OP 47). Communication indicated by the frame converted by the conversion unit 114 will not be recorded in the communication information recording table 122, and the communication completion flag in the record of the communication information recording table 122 that corresponds to the communication indicated by the received frame as recording target before conversion is set to "1."

When the received frame as recording target is not a reception completion response to final data (OP 46: No), the control unit 111 has the communication information managing unit 116 update the corresponding record of the communication information recording table 122 (OP 49). The record of the communication information recording table 122 that is updated here is the record recording the communication for reading the target file from the data source server to the client terminal, which is indicated by the unconverted received frame. The data requesting client terminal indicated by the unconverted received frame actually reads data from the substitute server, but the communication is recorded in the communication information recording table 122 to indicate that data is read from the original server as the destination of the data request that is indicated by the unconverted received frame.

The converted frame is output by the conversion unit 114 to the switch chip 13, via which output from the switch 1 (OP 48).

In OP 52, if negotiation with the substitute server candidate fails (OP 52: No), the virtual client unit 112 reports the failure to the control unit 111. Negotiation with a client terminal selected for the substitute server candidate can fail when the client terminal selected for the substitute server candidate does not have server services for the file sharing protocol, for example. The control unit 111 determines whether if there is any other client terminal that can replace the data source server indicated by the received frame as recording target (OP 55).

If there is any client terminal that can replace the server (OP 55: Yes), the substitute server candidate is selected again and negotiation with that candidate is performed (OP 51, OP 52). OP 51, OP 52, and OP 55 are repeated until the substitute server is decided or there is no more client terminal that can replace the server.

If there is no other client terminal that can replace the data source server indicated by the received frame subject to recording (OP 55: No), the control unit 111 has the virtual client unit 112 conduct negotiation with the original data source server indicated by the received frame. The virtual client unit 112 conducts negotiation with the original data source server indicated by the received frame masquerading as the client terminal indicated by the received frame (OP 56). As in OP 51, communication for negotiation with the original data source server in this case is performed by the virtual client unit 112 masquerading as the client terminal.

If the negotiation with the data source server indicated by the received frame as recording target is successful (OP 57: Yes), the flow proceeds to OP 46, where the communication information recording table 122 is updated (OP 47 or OP 49), and the received frame is output (OP 48).

If the negotiation with the original source server indicated by the received frame as recording target fails (OP 57: No), the control unit 111 instructs the virtual server unit 113 to send a connection error to the client terminal indicated by the received frame. For example, when load on the original source server indicated by the received frame exceeds a predetermined threshold, the server cannot carry out data reading communication and negotiation with the server will fail. The virtual server unit 113 sends a connection error to the data destination client terminal indicated by the received frame as recording target masquerading as the source server indicated by the frame (OP 58). Then, the process ends.

In OP 44, if there is no client terminal that can replace the data source server indicated by the received frame as recording target(OP 44: No), the flow proceeds to OP 56, where negotiation is conducted with the data source server.

Process Performed when Conversion Target Frame is Received

Figure 12A:
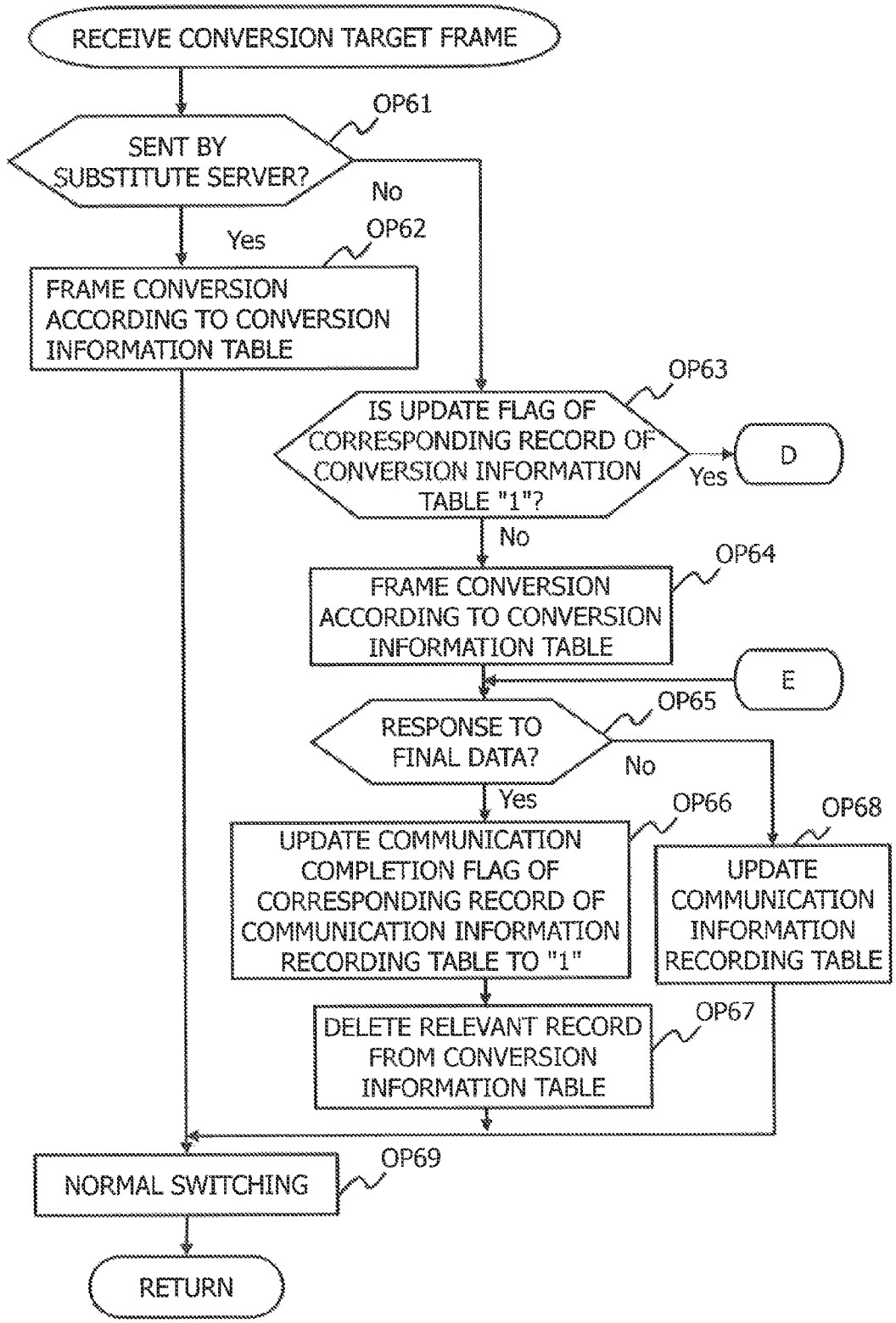
FIG. 12A is a diagram illustrating an example of a flow of a process for when the switch receives a conversion target frame.
Figure 12B:
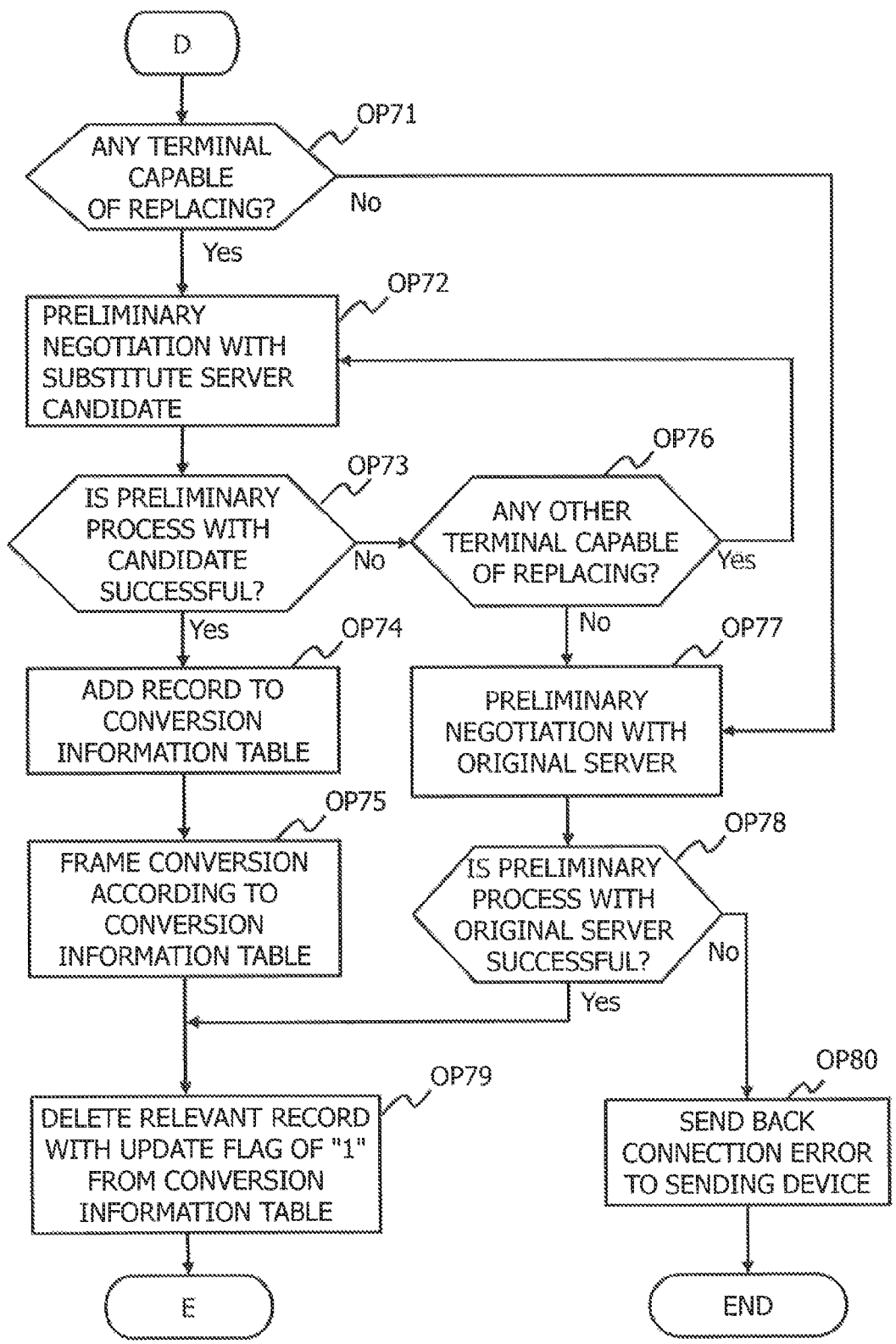
FIG. 12B is a diagram illustrating an example of a flow of a process for when the switch receives a conversion target frame.

FIGS. 12A and 12B are diagrams illustrating an example of a flow of a process performed when the switch 1 receives a frame as conversion target. The control unit 111 determines that a received frame is conversion target when the combination of the MAC addresses, IP addresses, port numbers and the like of the destination and source of the received frame matches the combination of values of MAC addresses, IP addresses, port numbers and the like of the server and the client, or the substitute server and the client in the conversion information table 123. A frame that matches a record of the conversion information table 123 when received by the switch 1 can be either a frame from the data requesting client terminal to the server of which data is requested or a frame from the substitute server to the data requesting client.

The control unit 111 determines whether the received frame as conversion target is sent by the substitute server (OP 61). The control unit 111 makes this determination by comparing the values of source MAC address and source IP address fields of the received frame with the values of substitute server MAC address and substitute server IP address fields of the conversion information table 123, for example.

If the received frame as conversion target is sent by the substitute server (OP 61: Yes), the control unit 111 outputs the received frame to the conversion unit 114. Since the received frame is sent by the substitute server, the conversion unit 114 rewrites the received frame by changing the source of the received frame from the substitute server to the server in accordance with the corresponding record of the conversion information table 123 (OP 62). In this example, the values of source MAC address, source IP address, source port number, source file path fields of the received frame as conversion target are converted to the values of the server MAC address, server IP address, server port number, server file path fields of the corresponding record of the conversion information table 123, for example. The converted frame is output to the switch chip 13 and output from the switch 1 through a normal switching process (OP 69).

If the received frame as conversion target is not sent by the substitute server (OP 61: No), it means that the received frame is sent by a client terminal to the server. The control unit 111 determines whether the value of update flag field of the record of the conversion information table 123 that corresponds to the received frame as conversion target is "1" (OP 63). In other words, the control unit 111 determines whether the client terminal that is indicated to be the substitute server by the value of substitute server MAC address field or the like of the record of the conversion information table 123 corresponding to the received frame as conversion target has sent a substitution request frame for an update request.

If the value of update flag field of the record of the conversion information table 123 that corresponds to the received frame as conversion target is not "1" (OP 63: No), it means that the client terminal acting as the substitute server of the record is able to perform data reading communication. The control unit 111 outputs the received frame as conversion target to the conversion unit 114.

Because the received frame as conversion target is sent by the client terminal to the server, the conversion unit 114 converts the destination of the frame from the server to the substitute server in accordance with the corresponding record of the conversion information table 123 (OP 64). In this case, the values of the destination MAC address, destination IP address, destination port number, source file path fields of the received frame as conversion target are converted to the values of substitute server MAC address, substitute server IP address, substitute server port number, substitute server file path fields of the corresponding record of the conversion information table 123 respectively, for example.

The control unit 111 determines whether the unconverted received frame that is conversion target is a reception response to final data (OP 65). If the unconverted received frame is a reception response to final data (OP 65: Yes), it means communication to read out data for the target file indicated by the unconverted frame has finished. The control unit 111 has the communication information managing unit 116 update the communication completion flag in the record of the communication information recording table 122 that corresponds to the communication indicated by the unconverted frame to "1" (OP 66). The communication completion flag being "1" in the record of the communication information recording table 122 that corresponds to the communication indicated by the unconverted frame means that the communication indicated by the record has finished. When target file reading communication indicated by the unconverted received frame has finished, the corresponding record in the conversion information table 123 is needless. Thus, the control unit 111 has the conversion information generating unit 117 delete the record of the conversion information table 123 (OP 67). The frame converted in OP 64 is output to the switch chip 13 and output from the switch 1 through a normal switching process (OP 69).

If the unconverted received frame as conversion target is not final data (OP 65: No), it means the data reading communication indicated by the unconverted received frame will continue. The control unit 111 has the communication information managing unit 116 update the record of the communication information recording table 122 that corresponds to the data reading communication indicated by the unconverted received frame (OP 68). The frame converted in OP 64 is output from the conversion unit 114 to the switch chip 13 and output from the switch 1 through a normal switching process (OP 69).

In OP 63, if the value of update flag field of the record of the conversion information table 123 that corresponds to the received frame is "1" (OP 63: Yes), it means that an update request has been received from the client terminal acting as the substitute server and data cannot be read from the substitute server. The control unit 111 determines whether there is any terminal that can replace the data source server indicated by the received frame other than the substitute server of the corresponding record of the conversion information table 123 (OP 71). That is, the control unit 111 newly selects the substitute server, through a similar process to OP 44 and OP 55.

If there is a client terminal that can replace the data source server other than the substitute server of the corresponding record of the conversion information table 123 (OP 71: Yes), the control unit 111 newly selects a substitute server candidate. For example, the control unit 111 extracts any client terminal that is indicated to already have acquired the target file from the source server indicated by the received frame in the communication information recording table 122. The control unit 111 further extracts any client terminal having "0" in the substitution request flag field of the device information table 121 from the extracted client terminals. From the client terminals extracted, the control unit 111 selects a client terminal having the smallest MAC address, for example, as the new substitute server candidate.

The control unit 111 has the virtual client unit 112 masquerade as the data requesting client terminal indicated by the received frame and conduct negotiation with the client terminal as the substitute server candidate (OP 72). This is done in a similar manner to OP 51 of FIG. 11B.

If the negotiation with the client terminal as the substitute server candidate is successful (OP 73: Yes), the control unit 111 determines the client terminal as the new substitute server. Information on the new substitute server acquired by the virtual client unit 112 is reported to the control unit 111.

The control unit 111 has the conversion information generating unit 117 generate a record in the conversion information table 123 for converting the communication to read data from the data source server to the data destination client terminal indicated by the received frame, into communication for reading data from the newly selected substitute server (OP 74).

After the new record is added to the conversion information table 123, the control unit 111 outputs the received frame to the conversion unit 114. Upon receiving the received frame, the conversion unit 114 converts the received frame in accordance with the new record of the conversion information table 123 (OP 75). In this case, the values of destination MAC address, destination IP address, destination port number, target file path fields of the received frame are respectively converted to the values of substitute server MAC address, substitute server IP address, substitute server port number, substitute server file path fields of the new record of the conversion information table 123, for example (OP 75). The substitute server is the newly selected substitute server.

As the record of the conversion information table 123 for the previous substitute server is needless, the control unit 111 has the conversion information generating unit 117 delete the record (OP 79). That is, the conversion information generating unit 117 deletes the record of the conversion information table 123 for the previous substitute server that corresponds to the received frame and that had "1" in its update flag field from the conversion information table 123 in OP 63.

If the unconverted received frame as conversion target is a reception completion response to final data (OP 65: Yes), the control unit 111 has the communication information managing unit 116 set "1" in the communication completion flag field of the record of the communication information recording table 122 that corresponds to the communication indicated by the unconverted received frame (OP 66). The value of communication completion flag field being "1" indicates that the data requesting client terminal indicated by the unconverted received frame has already acquired the target file. When the target file reading communication indicated by the unconverted received frame finishes, the corresponding record in the conversion information table 123 is needless. Thus, the control unit 111 has the conversion information generating unit 117 delete the record of the conversion information table 123 (OP 67).

If the unconverted received frame as conversion target is not a reception completion response to final data (OP 65: No), the control unit 111 has the communication information managing unit 116 update the record of the communication information recording table 122 that corresponds to the communication indicated by the unconverted received frame (OP 68). The record of the communication information recording table 122 updated here is the record corresponding to the communication for reading the target file from the source server indicated by the unconverted received frame to the client terminal based on the received frame as conversion target. The data destination client terminal indicated by the unconverted received frame actually reads data from the substitute server, but this communication is recorded in the communication information recording table 122 to indicate that the data is read from the original server of which data is requested that is indicated by the unconverted received frame. The frame converted in OP 75 is output to the switch chip 13 from the conversion unit 114, and output from the switch 1 via the switch chip 13 (OP 69).

In OP 73, if negotiation with the newly selected substitute server candidate fails (OP 73: No), the virtual client unit 112 reports the failure of negotiation to the control unit 111. Negotiation with a client terminal selected for a substitute server candidate fails when the client terminal selected for the substitute server candidate does not have server services for the file sharing protocol, for example. The control unit 111 further determines whether there is any other client terminal that can replace the server (OP 76).

If there is a client terminal that can replace the server (OP 76: Yes), the control unit 111 selects the substitute server candidate again and has the virtual client unit 112 conduct negotiation with that candidate (OP 72). OP 72, OP 73, and OP 76 are repeated until a new substitute server is established or there is no more client terminal that can replace the server.

If there is no other client terminal that can replace the server (OP 76: No), the control unit 111 has the virtual client unit 112 conduct negotiation with the original source server indicated by the received frame as conversion target (OP 77). The virtual client unit 112 conducts negotiation with the server masquerading as the data requesting client terminal indicated by the received frame as conversion target.

If the negotiation with the server as the destination of the data request indicated by the received frame subject to conversion is successful (OP 78: Yes), the flow proceeds to OP 79.

If the negotiation with the server as the destination of the data request indicated by the received frame as conversion target fails (OP 78: No), the control unit 111 has the virtual server unit 113 send a connection error to the destination client terminal indicated by the received frame (OP 80). For example, when load on the source server indicated by the received frame as conversion target exceeds a predetermined threshold, the server does not carry out data reading communication and negotiation with the server will fail.

If there is no client terminal that can replace the source server indicated by the received frame as conversion target in OP 71 (OP 71: No), the flow proceeds to OP 77, where negotiation is performed with the original server of which data is requested.

Process Performed when Masquerading Communication Frame is Received

Figure 13:
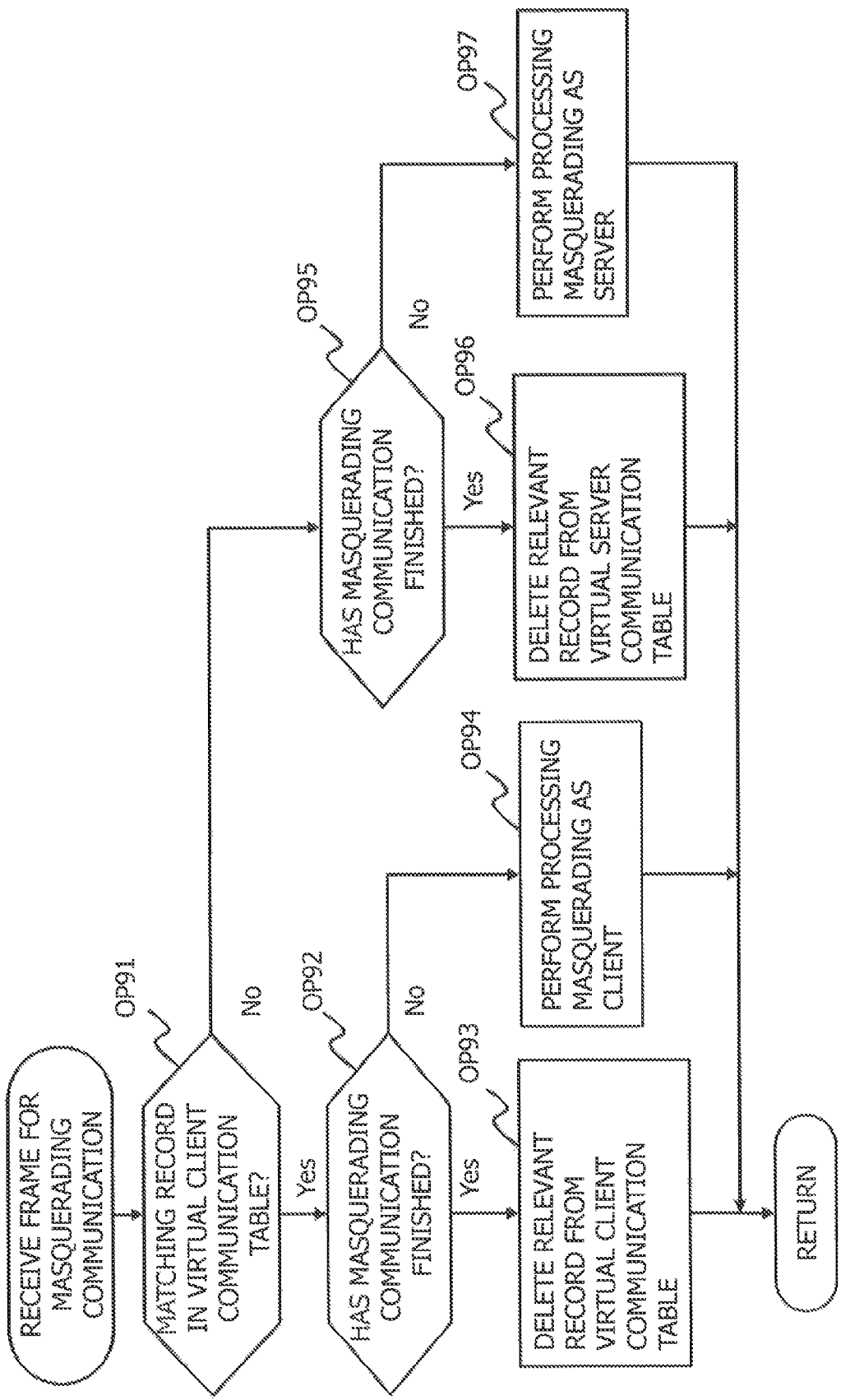
FIG. 13 is a diagram illustrating an example of a flow of a process for when the switch receives a frame for masquerading communication.

FIG. 13 is a diagram illustrating an example of a flow of a process that is performed when the switch 1 receives a frame for masquerading communication. A received frame is identified as a masquerading communication frame when the combination of MAC address and IP address of the destination and source of the received frame matches the virtual client communication table 125 or virtual server communication table 126.

If the received frame matches a record of the virtual client communication table 125 (OP 91: Yes), the control unit 111 outputs the received frame to the virtual client unit 112. The virtual client unit 112 processes the received frame. When the process performed by the virtual client unit 112 masquerading as the client terminal has finished (OP 92: Yes), the record is deleted from the virtual client communication table 125 (OP 93). If the process performed by the virtual client unit 112 masquerading as the client terminal has not finished (OP 92: No), the virtual client unit 112 continues to masquerade as the client terminal to perform communication with the file server 2 or substitute server (OP 94). The virtual client unit 112 determines whether the process involving masquerading as the client terminal has finished, for example, when it has acquired information needed for generating a record in the conversion information table 123.

If the received frame matches a record of the virtual server communication table 126 (OP 91: No), the control unit 111 outputs the received frame to the virtual server unit 113. The virtual server unit 113 processes the received frame. When the processing performed by the virtual server unit 113 masquerading as the file server 2 has finished (OP 95: Yes), the virtual server unit 113 deletes the corresponding record from the virtual server communication table 126 (OP 96). If the process performed by the virtual server unit 113 masquerading as the file server 2 has not finished (OP 95: No), virtual server unit 113 continues to masquerade as the file server 2 to perform communication with the client terminal (OP 97).

Example Operations

Figure 14:
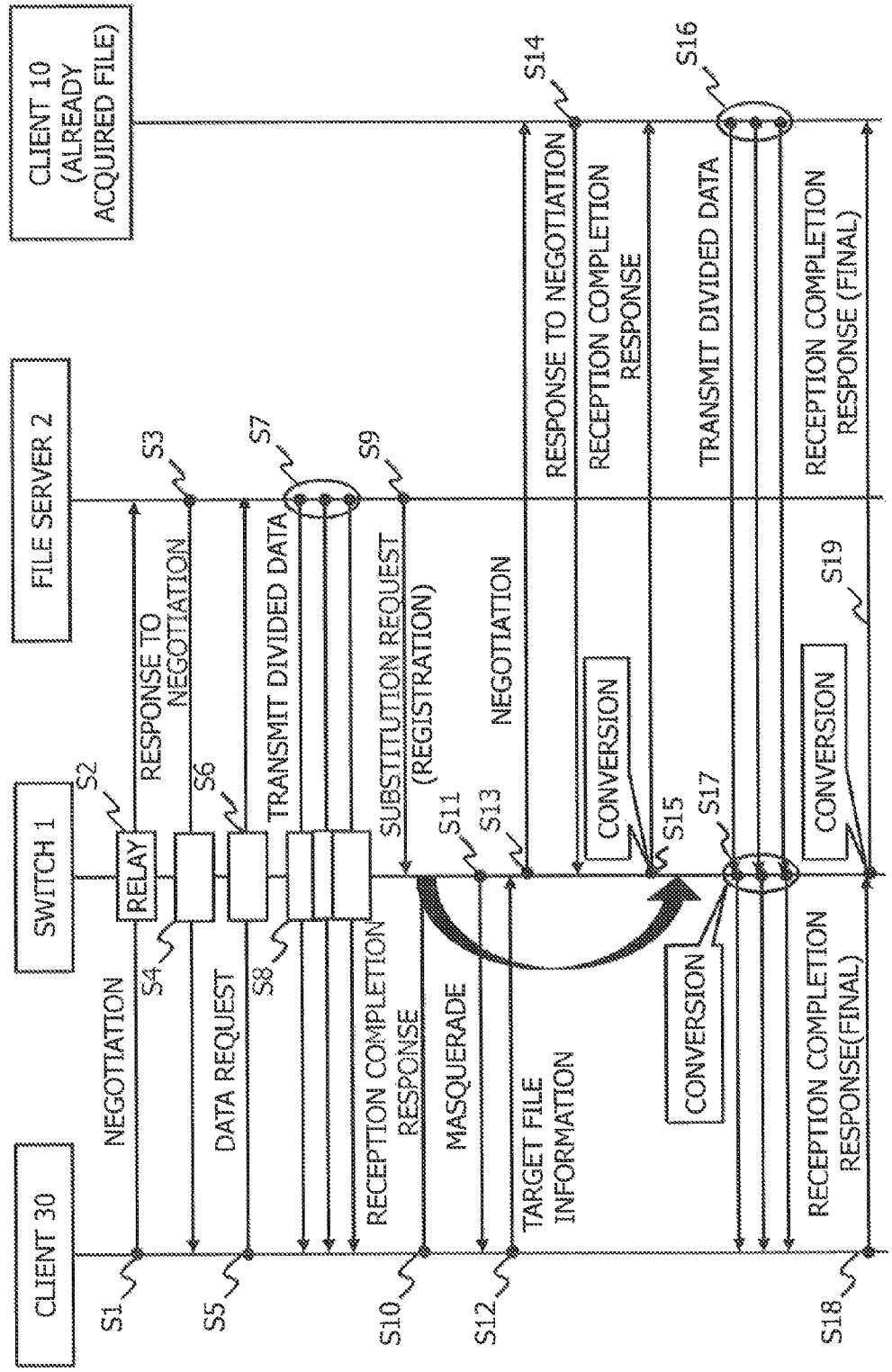
FIG. 14 is a diagram illustrating an example of operations of the switch in the network of FIG. 1.

FIG. 14 is a diagram illustrating an example of operations of the switch 1 in the data distribution network system illustrated in FIG. 1. FIG. 14 illustrates a case where communication for the client terminal 30 to read file A from the file server 2 is converted while in progress to communication for reading file A from the client terminal 10 due to increased load on the file server 2. The example of FIG. 14 assumes that the file server 2 has already performed communication for providing file A with multiple client terminals. In the example of FIG. 14, the client terminal 10 has already acquired file A from the file server 2 and the communication therefor is recorded in the communication information recording table 122 of the switch 1. In addition, neither of the file server 2 or client terminal 10 has sent substitution request frames for a registration request or an update request.

The client terminal 30 starts communication with the file server 2 for reading file A therefrom. The client terminal 30 initiates negotiation with the file server 2 (S1).

Frames for negotiation with the file server 2 are received by the switch 1. Because the received frame is a frame for the protocol used for data reading communication, e.g., SMB, and is defined as recording target, the switch 1 determines that the received frame is a recording target frame (FIG. 9, OP 24: Yes). As no substitution request frame representing a registration or update request has been received from the file server 2, "0" has been stored in the substitution request flag of the record of the device information table 121 in which the MAC address field matches the MAC address of the file server 2 (FIG. 11A, OP 41: No). Since the received frame is not a reception completion response to final data (FIG. 11A, OP 46: No), the switch 1 generates a record from information acquired from the received frame as recording target and adds the record to the communication information recording table 122 (FIG. 11A, OP 49). In the record of the communication information recording table 122 generated here, "client MAC address" is the MAC address of the client terminal 30, "server MAC address" is the MAC address of the file server 2, "client IP address" is the IP address of the client terminal 30, "server IP address" is the IP address of the file server 2, "client file path" is the path at which the target file is saved on the client terminal 30, "server file path" is the path at which the target file is saved on the file server 2, and "communication completion flag" is "0." The switch 1 relays frames for negotiation with the file server 2 to the file server 2 (S2, FIG. 11A, OP 48).

When the file server 2 receives a frame for negotiation relayed by the switch 1, it sends a response frame to the received negotiation to the client terminal 30 (S3).

The negotiation response frame from the file server 2 to the client terminal 30 is received by the switch 1. As this frame is also as recording target, the switch 1 performs similar process to S2 and relays the frame to the client terminal 30 (S4).

Although simplified in the example illustrated in FIG. 14, negotiation from S1 through S4 is actually repeated between the client terminal 30 and the file server 2 many times. Through the negotiation, information on the path of file A on the file server 2, assignment of file ID and the like is exchanged, and the preliminary process between the file server 2 and the client terminal 30 ends.

When the preliminary process for reading file A ends between the client terminal 30 and the file server 2, the client terminal 30 sends a request for reading file A to the file server 2 (S5).

The switch 1 relays the data request for file A from the client terminal 30 to the file server 2 as in S2 (S6).

Upon receiving the request for reading file A from the client terminal 30, the file server 2 divides the data of file A and sends data of a predetermined size in a number of transmissions (S7). Assume that a part of data for file A is sent to the client terminal 30 in this stage.

The switch 1 relays the data for file A sent from the file server 2 to the client terminal 30 as in S2 (S8).

In FIG. 14, the file server 2 sends a substitution request frame representing a registration request, which requests a communication conversion process, to the switch 1 due to increased load resulting from communication with multiple client terminals other than the client terminal 30 (S9). If the substitution request frame is defined by the PAUSE frame illustrated in FIG. 6, for example, a PAUSE frame with the substitution request code field set to "0x01" is sent. When receiving the frame, the switch 1 finds that the received frame is a substitution request frame (FIG. 9, OP 21: Yes). Since the received frame is a substitution request frame representing a registration request from the file server 2, the switch 1 sets "1" in the substitution request flag field of the record of the device information table 121 in which the MAC address field matches the MAC address of the file server 2 (FIG. 10, OP 35).

Assume the client terminal 30 then sends a reception completion response to the data transmission in S7 from the file server 2, to the file server 2 (S10).

The reception completion response sent by the client terminal 30 is received at the switch 1 before it reaches the file server 2. Since the received frame is a reception completion response for an SMB, for example, the switch 1 determines that the frame is recording target (FIG. 9, OP 24: Yes). Since the switch 1 has received the substitution request frame for a registration request from the file server 2, "1" has been stored in the substitution request flag field of the record of the device information table 121 in which the MAC address field matches the MAC address of the file server 2 (FIG. 11A, OP 41: Yes). The switch 1 masquerades as the file server 2 and acquires information on file A from the client terminal 30 (S11, S12, FIG. 11A, OP 43). To the client terminal 30, this communication seems to be communication with the file server 2.

Assume that the switch 1 selects client terminal 10 for the substitute server (FIG. 11A, OP 44: Yes). The switch 1 conducts negotiation with the client terminal 10 selected as the substitute server, masquerading as the client terminal 30 (S13, FIG. 11B, OP 51). The client terminal 10 sends a response to the negotiation from the switch 1 (S14). To the client terminal 10, the communication here seems to be negotiation with the client terminal 30.

When negotiation with the client terminal 10, i.e., the substitute server, is successful (FIG. 11B, OP 52: Yes), the switch 1 generates and adds a record to the conversion information table 123 (FIG. 11B, OP 53). The record of the conversion information table 123 generated here is a record for converting communication with the file server 2 from the client terminal 30 for reading file A into communication with the client terminal 10 for reading file A. By way of example, assume that the record illustrated in the example conversion information table 123 of FIG. 8 is created.

The switch 1 converts the reception completion response from the client terminal 30 to the file server 2 received in S10 into a reception completion response to the client terminal 10 acting as the substitute server in accordance with the conversion information table 123, and sends it (S15, FIG. 11B, OP 54). In the reception completion response from the client terminal 30 to the file server 2 received by the switch 1 in S10, the values of destination MAC address, destination IP address, destination port number, and file A source path fields all indicate the file server 2. The switch 1 rewrites the values of destination MAC address, destination IP address, destination port number, and file A source path fields of the reception completion response so that they indicate the client terminal 10 acting as the substitute server, in accordance with the conversion information table 123 illustrated in FIG. 8, for example.

After receiving the reception completion response converted at the switch 1, the client terminal 10 divides the unsent data of file A and sends data to the client terminal 30 in a number of transmissions (S16).

The switch 1 receives data for file A sent by the client terminal 10 acting as the substitute server. The destination MAC address, destination IP address, destination port number, and destination file path of the received frame all indicate the client terminal 30. The source MAC address, source IP address, source port number, destination file path, and file ID of the received frame all indicate the client terminal 10 acting as the substitute server. The switch 1 determines that the received frame is conversion target (FIG. 9, OP 23: Yes), because the received frame matches the record of the conversion information table illustrated in FIG. 8, for example. Since the received frame is sent by the client terminal 10 acting as the substitute server (FIG. 12A, OP 61: Yes), the switch 1 converts the received frame in accordance with the conversion information table 123 and sends it to the client terminal 30 (S17, FIG. 12, OP 62). The switch 1 rewrites the values of source MAC address, source IP address, source port number, source file path, and file ID fields of the received frame from those of the client terminal 10 acting as the substitute server to those of the file server 2, in accordance with the record of the conversion information table 123 illustrated in FIG. 8, for example.

When final data for file A is sent from the client terminal 10 acting as the substitute server in S16, the client terminal 30 sends a reception response completion to the final data to the file server 2 (S18).

The reception response completion to the final data sent by the client terminal 30 to the file server 2 is received by the switch 1. The values of the destination MAC address, destination IP address, destination port number, source file path, file ID fields of the received frame all indicate those of the file server 2. The values of source MAC address, source IP address, source port number, destination file path fields of the received frame all indicate those of the client terminal 30. The switch 1 thus determines that the received frame is conversion target as it matches the record of the conversion information table illustrated in FIG. 8, for example (FIG. 9, OP 23: Yes).

The received frame is sent by the client terminal 30 (FIG. 12A, OP 61: No) and the update flag field of the record of the conversion information table 123 corresponding to the received frame is "0" (FIG. 12A, OP 63: No). The switch 1 converts the received frame in accordance with the corresponding record of the conversion information table 123 and sends it (S19, FIG. 12A, OP 64). The switch 1 converts the values of the destination MAC address, destination IP address, destination port number, source file path, file ID fields of the received frame from those of the file server 2 to those of the client terminal 10 acting as the substitute server.

The received frame is also a response to the final data (FIG. 12A, OP 65: Yes). Thus, the switch 1 updates the communication completion flag field of the corresponding record of the communication information recording table 122 corresponding to the received frame to "1" (FIG. 12, OP 66). The record of the communication information recording table 122 updated here is the record with the "server" being file server 2 and "client" being client terminal 30, that is, the record corresponding to the communication indicated by the received frame. The switch 1 also deletes the record for the unconverted received frame from the conversion information table 123 (FIG. 12A, OP 67). The record of the conversion information table 123 deleted here is the record in which the values of fields relating to the client such as client MAC address are relevant to the client terminal 30, the values of fields relating to the server such as server MAC address are relevant to the file server 2, and the values of fields relating to the substitute server such as substitute server MAC address are relevant to the client terminal 10. The converted reception completion response to the final data is sent from the switch 1 to the client terminal 10 (FIG. 12A, OP 69).

Effects of the First Embodiment

In the first embodiment, when receiving a request for a communication conversion process from the file server 2, for example, the switch 1 changes the data source of data reading communication with the file server 2 to a client terminal that has already acquired that data from the file server 2. This can distribute load imposed on the file server 2, enabling efficient data distribution. In addition, by the switch 1 converting a frame sent from a client terminal to the file server so that its destination is changed from the file server 2 to the substitute server, the client terminal can perform data reading communication as if it is communicating with the file server 2.

Additionally, since the first embodiment simply provides modification to the switch configuration, no capital investment is involved on the file server side; performance efficiency of the entire network can be improved at low costs compared to when the file server is made dual-redundant.

Others

In the first embodiment, the switch 1 selects the client terminal with the smallest MAC address when selecting a substitute server from substitute server candidates, e.g., in OP 44 of FIG. 11A, OP 55 of FIG. 11B, and OP 71 and OP 76 of FIG. 12B. Alternatively, the switch 1 may assess the load condition of connected lines and select a device that is connected with a line with less load for the substitute server based on load level.

Alternatively, devices connected with the switch 1 may report the load conditions of their HDDs or CPU in frames of a predefined format, and a device with less load may be selected as the substitute server based on such information, that is, with reference to device load. In this case, the device information table 121 is expanded so information on device load condition is added to the table 121.

In the first embodiment, communication for reading data from the client terminal acting as the substitute server for the file server 2 is recorded as communication for reading data from the file server 2 (see FIGS. 11A, 11B, 12A, and 12B). Alternatively, communication for reading data from the client terminal acting as the substitute server for the file server 2 may be recorded in the communication information recording table 122 as it is.

The first embodiment is described by illustrating a case where conversion is applied to communication for a client terminal to read data from the file server. The communication conversion process described in the first embodiment is applicable to any communication using a protocol that can be analyzed by a switch, in addition to data reading communication.

Although in the first embodiment conversion of communication between the file server and the client terminal is described, the communication conversion process can be similarly applied to communication between client terminals as long as they have server services for the protocol used.

In addition, in the first embodiment, a client terminal that has already acquired the target file is selected for the substitute server. However, a client terminal that is currently reading the target file may be selected for the substitute server.

The first embodiment mentioned that a communication conversion process is performed by the CPU 11 of the switch 1 executing the relay program 12*p* stored in the memory 12. Alternatively, a communication conversion process may be implemented in an electronic circuit for a specific kind of process, such as an ASIC (Application Specific Integrated Circuit), for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiments of the present invention have been described in detail, it should be understood that the various changes, substitutions, and alterations could be made hereto without departing from the spirit and scope of the invention.

What is claimed is:

1. A relay device for relaying communication of data by a first device to communication of data by a second device the relay device comprising:
   a storage unit that stores information identifying relayed data with information identifying a recipient of the data; and
   a control unit that, in response to receiving a substitution request sent by the first device according to a load condition of the first device and in response to a data acquisition request for predetermined data that is issued by a third device to acquire the predetermined data from the first device, causes the second device to send the predetermined data to the third device based on information in the storage unit.

2. The relay device according to claim 1, wherein
   the control unit causes, depending on a load condition of the second device, a fourth device to send the predetermined data to the third device that issued the data acquisition request for the predetermined data, the fourth device differing from the second device and having received the predetermined data, based on information in the storage unit.

3. A relay system comprising a relay device for relaying communication of data by a first device to communication of data by a second device, wherein:
   the first device includes a processor configured to:
      receive, from a third device, a data acquisition request for data; and
      send, in response to receiving the data acquisition request for the data, a substitution request according to a load condition of the first device, and
   the relay device includes:
      a storage unit that stores information identifying relayed data with information identifying a recipient of the data; and
      a control unit that, in response to receiving the substitution request sent by the first device and in response to a data acquisition request for predetermined data issued by the third device to the first device, causes the second device to send the predetermined data to the third device based on information in the storage unit.

4. A relay method for relaying communication of data by a first device to communication of data by a second device, the relay method comprising:
   storing information identifying relayed data with information identifying a recipient of the data in a storage unit; and
   causing, in response to receiving a substitution request sent by the first device according to a load condition of the first device and in response to a data acquisition request for predetermined data that is issued by a third device to acquire the predetermined data from the first device, the second device to send the predetermined data to the third device based on information in the storage unit.

5. A non-transitory computer-readable storage medium having stored therein a program for causing a relay device to execute a process to relay communication of data by a first device to communication of data by a second device, the process comprising:
   storing information identifying relayed data with information identifying a recipient of the data in a storage unit; and
   causing, in response to receiving a substitution request sent by the first device according to a load condition of the first device and in response to a data acquisition request for predetermined data that is issued by a third device to acquire the predetermined data from the first device, the second device to send the predetermined data to the third device based on information in the storage unit.

* * * * *